(12) United States Patent
Kitamori et al.

(10) Patent No.: US 12,739,522 B2
(45) Date of Patent: Sep. 15, 2026

(54) VIBRATING DEVICE AND IMAGING DEVICE

(71) Applicant: Murata Manufacturing Co., Ltd., Nagaokakyo (JP)

(72) Inventors: Nobumasa Kitamori, Nagaokakyo (JP); Takahide Nakadoi, Nagaokakyo (JP); Yuuki Ishii, Nagaokakyo (JP); Noritaka Kishi, Nagaokakyo (JP); Hitoshi Sakaguchi, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 93 days.

(21) Appl. No.: 18/652,016

(22) Filed: May 1, 2024

(65) Prior Publication Data

US 2024/0284059 A1 Aug. 22, 2024

Related U.S. Application Data

(63) Continuation of application No. PCT/JP2022/022360, filed on Jun. 1, 2022.

(30) Foreign Application Priority Data

Nov. 26, 2021 (JP) ................................ 2021-192472

(51) Int. Cl.
*H04N 23/81* (2023.01)
*H04N 23/51* (2023.01)

(52) U.S. Cl.
CPC ............ *H04N 23/81* (2023.01); *H04N 23/51* (2023.01)

(58) Field of Classification Search
CPC ........ H04N 23/81; H04N 23/51; H04N 23/52; B06B 1/06; G02B 7/02; G03B 15/00; G03B 17/02; G03B 30/00
See application file for complete search history.

(56) References Cited

U.S. PATENT DOCUMENTS

2009/0225214 A1* 9/2009 Takizawa .............. H04N 23/55 359/507
2016/0266379 A1* 9/2016 Li .......................... B08B 7/028
(Continued)

FOREIGN PATENT DOCUMENTS

JP 2017-170303 A 9/2017
JP 2020181079 A 11/2020
(Continued)

OTHER PUBLICATIONS

International Search Report in PCT/JP2022/022360, mailed Aug. 23, 2022, 3 pages.

(Continued)

*Primary Examiner* — Sinh Tran
*Assistant Examiner* — Zhenzhen Wu
(74) *Attorney, Agent, or Firm* — Keating & Bennett, LLP

(57) ABSTRACT

A vibrating device includes a light transmitting body, a vibrating body with a tubular structure including a first end portion, a second end portion, and a side wall joining the first and second end portions, and connected to the light transmitting body at the first end portion to vibrate the light transmitting body, an extending portion extending outward from the side wall of the vibrating body, and a piezoelectric element at the second end portion of the vibrating body.

17 Claims, 24 Drawing Sheets

(56) References Cited

U.S. PATENT DOCUMENTS

| | | | | |
|---|---|---|---|---|
| 2020/0038914 | A1 | 2/2020 | Fujimoto et al. | |
| 2020/0055087 | A1* | 2/2020 | Fujimoto | B06B 1/0651 |
| 2020/0213495 | A1* | 7/2020 | Fujimoto | B08B 7/04 |
| 2020/0338607 | A1 | 10/2020 | Kitamori et al. | |
| 2020/0379321 | A1* | 12/2020 | Fujimoto | B06B 1/06 |
| 2020/0406298 | A1* | 12/2020 | Fujimoto | G03B 17/02 |
| 2021/0078043 | A1* | 3/2021 | Ishii | B06B 1/0644 |
| 2021/0154703 | A1* | 5/2021 | Fujimoto | B06B 1/0655 |
| 2021/0302723 | A1 | 9/2021 | Fujimoto et al. | |

FOREIGN PATENT DOCUMENTS

| | | | | |
|---|---|---|---|---|
| WO | 2018198417 | A1 | 11/2018 | |
| WO | WO-2020003571 | A1 * | 1/2020 | G03B 17/56 |
| WO | WO-2020003572 | A1 * | 1/2020 | B06B 1/06 |
| WO | 2021192387 | A1 | 9/2021 | |

OTHER PUBLICATIONS

Written Opinion in PCT/JP2022/022360, mailed Aug. 23, 2022, 4 pages.

* cited by examiner 1
w1
t1
21
21a
21b
20c
20a
20d
24
20
25
30
20b
10
Z
Y
X

VIBRATING DEVICE AND IMAGING DEVICE

CROSS REFERENCE TO RELATED APPLICATIONS

This application claims the benefit of priority to Japanese Patent Application No. 2021-192472 filed on Nov. 26, 2021 and is a Continuation Application of PCT Application No. PCT/JP2022/022360 filed on Jun. 1, 2022. The entire contents of each application are hereby incorporated herein by reference.

BACKGROUND OF THE INVENTION

1. Field of the Invention

The present invention relates to vibrating devices and imaging devices.

2. Description of the Related Art

There has been known a droplet removal device to remove droplets and the like adhering to a light flux transmission region of a splash-proof cover.

For example, Japanese Unexamined Patent Application Publication No. 2017-170303 discloses a droplet removal device including a vibrating member, which is connected to an end portion of a curved surface that constitutes a dome portion of an optical element, and generates bending vibration on the dome portion. The droplet removal device described in Japanese Unexamined Patent Application Publication No. 2017-170303 controls the vibrating member so as to generate a prescribed vibration on the dome portion, thereby micrifying and removing the droplets and the like adhering thereto.

SUMMARY OF THE INVENTION

The droplet removal device described in Japanese Unexamined Patent Application Publication No. 2017-170303 still has room for improvement in terms of efficiently vibrating the dome portion.

Example embodiments of the present invention provide vibrating devices that each efficiently vibrate a light transmitting body.

A vibrating device according to an aspect of an example embodiment of the present invention includes a light transmitting body, a vibrating body with a tubular structure including a first end portion, a second end portion, and a side wall joining the first and second end portions, the vibrating body being connected to the light transmitting body at the first end portion to vibrate the light transmitting body, an extending portion extending outward from the side wall of the vibrating body, and a piezoelectric element at the second end portion of the vibrating body.

According to example embodiments of the present invention, it is possible to provide vibrating devices that each efficiently vibrate a light transmitting body.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
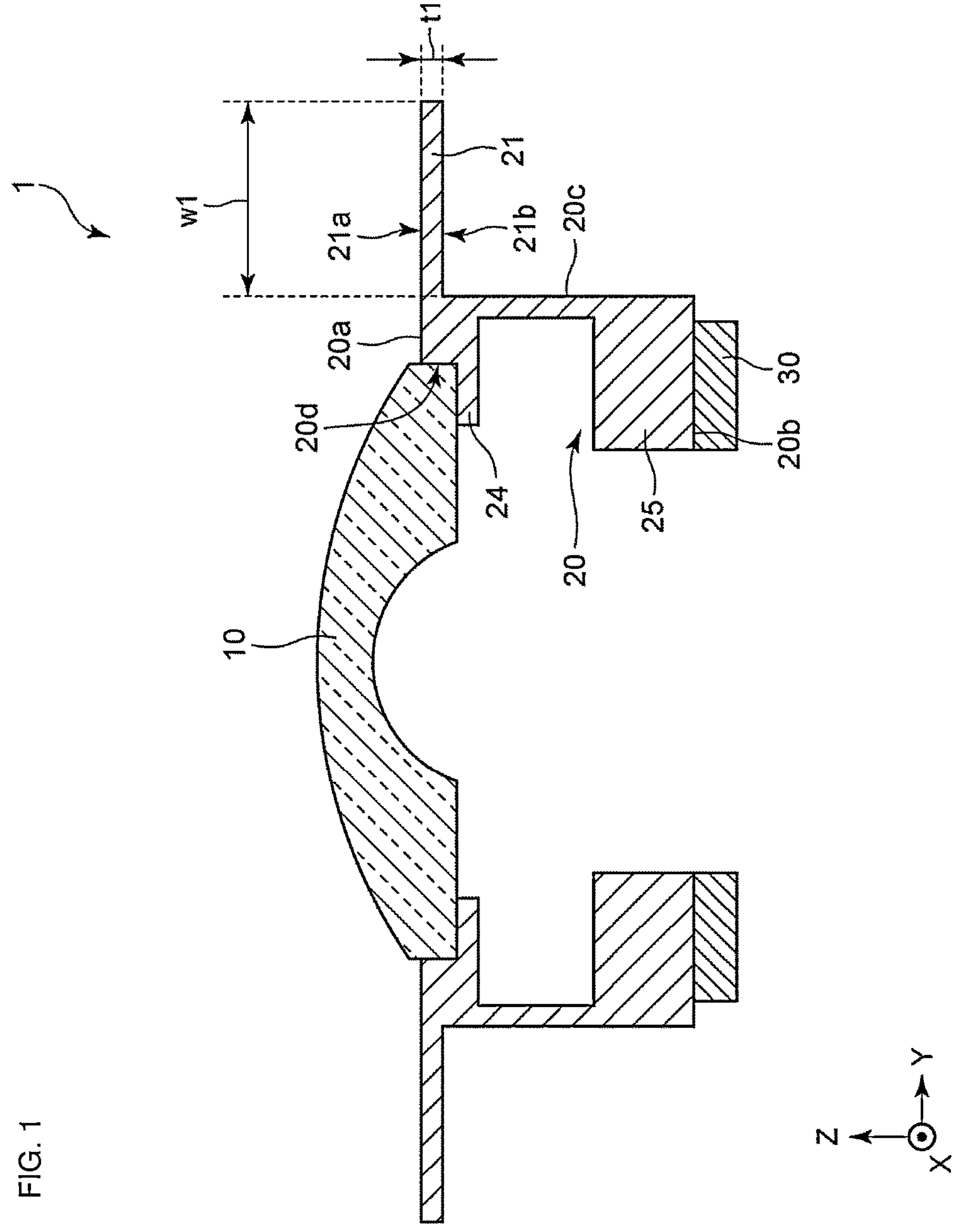
FIG. 1 is a cross-sectional view illustrating a vibrating device according to Example Embodiment 1 of the present invention.

Cameras used outdoors including a vehicle-mounted camera, a monitoring camera, and the like, as well as a camera mounted on a drone are exposed to wind and rain, and are therefore each provided with a cover formed from glass, a transparent plastic material, or the like in such a way as to cover its lens. When foreign matter such as a water droplet adheres to the cover, an image shot with the camera may capture the foreign matter, thus failing to realize a clear image because a view of the camera is blocked.

In this regard, there has been considered a device such as the droplet removal device described in Japanese Unexamined Patent Application Publication No. 2017-170303, which micrifies, atomizes, and removes foreign matter such as a water droplet adhering to a splash-proof cover by providing the splash-proof cover with a piezoelectric body and subjecting the splash-proof cover to bending vibration.

In the droplet removal device described in Japanese Unexamined Patent Application Publication No. 2017-170303, a piezoelectric element is bonded and fixed to a flange portion of the splash-proof cover. Accordingly, the flange portion of the splash-proof cover located outside a view field of the imaging device is also vibrated by the vibration of the piezoelectric element. In other words, there is a problem that the vibration of the piezoelectric element leaks out to the flange portion of the splash-proof cover, and it is difficult to efficiently vibrate the splash-proof cover.

Meanwhile, there is a problem that the vibration of the piezoelectric element cannot be efficiently transmitted to the splash-proof cover due to a manufacturing variation of the droplet removal device, and it is difficult to efficiently vibrate the splash-proof cover.

The inventors of example embodiments of the present invention have considered a vibrating device that can efficiently vibrate a light transmitting body, and have conceived of and developed the following example embodiments of the present invention.

A vibrating device according to a first aspect of an example embodiment of the present invention includes a light transmitting body, a vibrating body with a tubular structure including a first end portion, a second end portion, and a side wall joining the first and second end portions, the vibrating body being connected to the light transmitting body at the first end portion to vibrate the light transmitting body, an extending portion extending outward from the side wall of the vibrating body, and a piezoelectric element at the second end portion of the vibrating body.

According to the above-described configuration, it is possible to provide a vibrating device that efficiently vibrates a light transmitting body.

In a vibrating device according to a second aspect of an example embodiment of the present invention, the extending portion may be bent toward a side of the first end portion or a side of the second end portion.

According to the above-described configuration, it is possible to provide a guide to drain water droplets and the like to the outside, thereby efficiently removing the water droplets and the like.

In a vibrating device according to a third aspect of an example embodiment of the present invention, the extending portion may extend outward on a side of the first end portion of the vibrating body.

According to the above-described configuration, the extending portion serves as a vibration node, so that the vibration efficiency can further be improved.

In a vibrating device according to a fourth aspect of an example embodiment of the present invention, the extending portion may extend outward from the first end portion of the vibrating body.

According to the above-described configuration, the extending portion serves as the vibration node. Thus, adhesion of the foreign matter such as a water droplet is less likely to affect a vibration performance.

A vibrating device according to a fifth aspect of an example embodiment of the present invention may further include a retainer including a first structure with a tubular shape, being located on the first end portion side of the vibrating body, and being fitted to the side wall of the vibrating body, and a second structure extending inward from an inner side surface of the first structure and contactable with a surface of the light transmitting body on an opposite side from a surface to be connected to the vibrating body, the extending portion may extend outward from an outer side surface of the first structure of the retainer.

According to the above-described configuration, it is possible to hold the light transmitting body firmly and to improve reliability of the vibrating device.

In a vibrating device according to a sixth aspect of an example embodiment of the present invention, one or a plurality of weights may be provided at least at any of a first surface on a side of the first end portion or a second surface on a side of the second end portion of the extending portion.

According to the above-described configuration, in addition to the extending portion, the weight portion also serves as the vibration node. Thus, it is possible to further improve the vibration efficiency.

In a vibrating device according to a seventh aspect of an example embodiment of the present invention, the plurality of weights may be provided at the extending portion at regular intervals when viewed in an axial direction of the vibrating body.

According to the above-described configuration, it is possible to further improve the vibration efficiency of the vibrating device.

A vibrating device according to an eighth aspect of an example embodiment of the present invention may further include a cover including a hole to expose the light transmitting body, which is outside the light transmitting body and is fitted to the extending portion to come into contact with a surface of one of the plurality of weights, the one of the plurality of weights may have a closed shape, and a seal may be provided in a groove in a surface of the one of the plurality of weights.

According to the above-described configuration, it is possible to reduce or prevent entry of foreign matter such as a water droplet into the vibrating device while maintaining the vibration performance of the vibrating device and to improve reliability of the vibrating device, or more specifically, a waterproof performance thereof.

In a vibrating device according to a ninth aspect of an example embodiment of the present invention, an end portion on a side of the hole of the cover may have a tapered shape with a thickness that decreases toward the light transmitting body.

According to the above-described configuration, it is possible to achieve both improvement in performance and improvement in reliability of the vibrating device.

In a vibrating device according to a tenth aspect of an example embodiment of the present invention, the vibrating body may include a first projecting portion projecting inward from the first end portion, and a second projecting portion projecting inward from the second end portion, the vibrating device may further include a holding portion being connected to the second projecting portion and holding the vibrating body.

According to the above-described configuration, the second projecting portion of the vibrating body serves as a node. Thus, the holding portion can be connected to the vibrating device without affecting the vibration performance. Moreover, it is possible to reduce an effective volume of the vibrating device and to realize the vibrating device in a small size.

An imaging device according to an eleventh aspect of an example embodiment of the present invention includes any of the above-mentioned vibrating devices, and an imager inside the vibrating device.

According to the above-described configuration, it is possible to provide an imaging device having high reliability.

Example embodiments of the present invention will be described below in accordance with the accompanying drawings. Note that the following description is mere exemplification in essence and is not intended to restrict the present invention, applications thereof, or usages thereof. Moreover, the drawings are schematic and respective ratios of dimensions and the like are not always in accordance with the reality.

Example Embodiment 1

Overall Configuration

FIG. 1 is a cross-sectional view illustrating a vibrating device 1 according to Example Embodiment 1.

As illustrated in FIG. 1, the vibrating device 1 includes a light transmitting body 10, a vibrating body 20, an extending portion 21, and a piezoelectric element 30. The vibrating device 1 can be used as an imaging device by housing an imaging element inside.

The vibrating device 1 is a device that vibrates the light transmitting body 10 by transmitting vibration from the piezoelectric element 30 disposed at the vibrating body 20 to the light transmitting body 10 with the vibrating body 20 interposed therebetween, thereby removing foreign matter such as a water droplet or mud adhering to the light transmitting body 10. A not-illustrated conductor that applies an electric potential to the piezoelectric element 30 may be disposed at the vibrating device 1.

Figure 2:
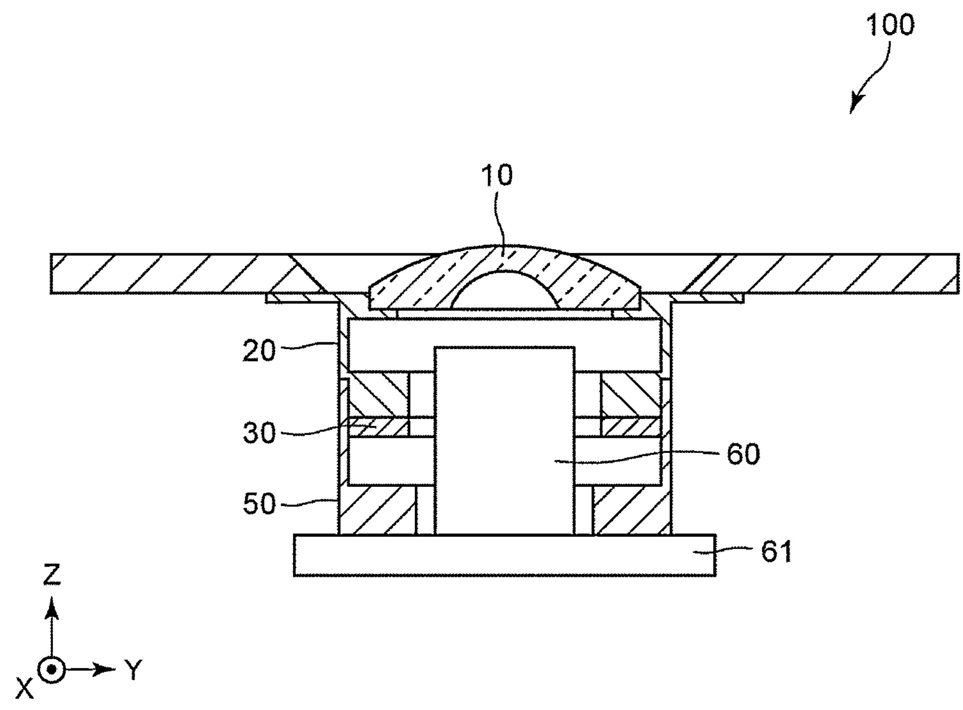
FIG. 2 is a cross-sectional view illustrating an imaging device that includes the vibrating device of FIG. 1.

FIG. 2 is a cross-sectional view illustrating an imaging device 100 that includes the vibrating device 1 of FIG. 1. As illustrated in FIG. 2, the vibrating device 1 can be used as the imaging device 100 by housing an imaging element 60 (imager) inside. In other words, the imaging device 100 includes the vibrating device 1 and the imaging element 60. For example, the imaging element 60 is connected to a board 61 and the like. Using the imaging element 60, an imaging object outside of the vibrating device 1 can be imaged through the light transmitting body 10 of the vibrating device 1. In FIG. 2, the vibrating device 1 is fixed to the board 61 with a holding portion 50 interposed therebetween.

Respective elements and features of the vibrating device 1 will be described below in detail.

Light Transmitting Body

The light transmitting body 10 functions as a cover to protect the imaging element housed in the vibrating device 1 against adhesion of foreign matter. Moreover, the light transmitting body 10 may also function as a lens that is optically designed. The light transmitting body 10 has a light transmission property to transmit either light or an energy line having a wavelength to be detected by the imaging element. In the present example embodiment, the light transmitting body 10 preferably has a dome shape as illustrated in FIG. 1.

As a material of the light transmitting body 10, it is possible to use glass such as soda glass, borosilicate glass, aluminosilicate glass, or silica glass, light transmitting plastics, light transmitting ceramics, synthetic resins, and the like, for example. It is possible to strengthen the light transmitting body 10 by forming the light transmitting body 10 from reinforced glass with improved strength via chemical reinforcement and the like, for example.

Vibrating Body

The vibrating body 20 is configured to vibrate the light transmitting body 10 by receiving vibration of the piezoelectric element 30. As illustrated in FIG. 1, the vibrating body 20 is a tubular structure including a first end portion 20*a*, a second end portion 20*b*, and a side wall 20*c* joining the first end portion 20*a* and the second end portion 20*b*. The first end portion side of the vibrating body 20 is connected to the light transmitting body 10. For example, the light transmitting body 10 can be connected to the vibrating body 20 by using an adhesive and the like.

In the present example embodiment, a recess 20*d* to accommodate the light transmitting body 10 is provided at the first end portion 20*a* of the vibrating body 20 as illustrated in FIG. 1. Here, the first end portion 20*a* of the vibrating body 20 may be formed flat and the light transmitting body 10 may be fixed to the first end portion 20*a* by using the adhesive and the like.

In the present example embodiment, the vibrating body 20 includes a first projecting portion 24 that projects inward from the first end portion 20*a*, and a second projecting portion 25 that projects inward from the second end portion 20*b*. Since the vibrating body 20 has the above-described shape, the extending portion 21 and a portion of the second projecting portion 25 serve as a node having a small amount of displacement of the vibrating body 20 by vibration.

A metal, ceramics, or the like can be used as a material of the vibrating body 20, for example. As for the metal, it is possible to use stainless steel, 42 Ni—Fe alloy, 50 Ni—Fe alloy, invar alloy, superinvar alloy, Kovar alloy, aluminum, duralumin, or the like, for example. Meanwhile, the vibrating body 20 may be formed from ceramics such as alumina and zirconia. The vibrating body 20 may be formed from a semiconductor such as Si. In the meantime, the vibrating body 20 may be subjected to insulation coating such as an alumite treatment.

Extending Portion

As illustrated in FIG. 1, the extending portion 21 extends outward from the side wall 20*c* of the vibrating body 20. In the vibrating device 1, the extending portion 21 extends outward from the first end portion 20*a* of the vibrating body 20. The extending portion 21 is a portion that serves as a node having the amount of displacement of 0 by the vibration when the vibrating body 20 is vibrated. Since the extending portion 21 serves as a vibration node, the vibration of the vibrating body 20 can be efficiently transmitted to the light transmitting body 10 without causing a leakage of the vibration out to the extending portion 21. Meanwhile, even when foreign matter such as a water droplet or mud adheres to the extending portion 21, it is possible to reduce an effect on a vibration performance of the vibrating body 20.

In the present example embodiment, the extending portion 21 is a flange at a side wall on the first end portion 20*a* side of the vibrating body 20. Accordingly, the extending portion 21 has a ring shape when viewed in an axial direction (Z direction) of the vibrating body 20. Meanwhile, the extending portion 21 and the vibrating body 20 are integrally formed. The extending portion 21 has a plate shape provided with a first surface 21*a* on the first end portion 20*a* side of the vibrating body 20 and a second surface 21*b* on the second end portion 20*b* side of the vibrating body 20.

A thickness t1 of the extending portion 21 may preferably be equal to or greater than about 0.25 mm and equal to or less than about 1 mm, for example. More preferably, the thickness t1 of the extending portion 21 may have a thickness of about 0.5 mm, for example. In this case, it is possible to reduce the amount of displacement of the extending portion 21 and to efficiently transmit the vibration of the vibrating body 20 to the light transmitting body 10. Meanwhile, a width w1 of the extending portion 21 may preferably be equal to or greater than about 4 mm and equal to or less than about 6 mm, for example. More preferably, the width w1 of the extending portion 21 may be about 4.6 mm, for example. In this case, it is possible to reduce the amount of displacement of the extending portion 21 and to efficiently transmit the vibration of the vibrating body 20 to the light transmitting body 10. Here, the width w1 of the extending portion 21 represents a length of the extending portion 21 projecting from the side wall 20*c* of the vibrating body 20.

Meanwhile, in the present example embodiment, the extending portion 21 extends from the first end portion 20*a* of the vibrating body in a direction orthogonal to the axial direction (the Z direction) of the vibrating body 20. Specifically, the extending portion 21 is formed such that the first end portion 20*a* of the vibrating body 20 and the first surface 21*a* of the extending portion 21 have substantially the same height in the axial direction of the vibrating body 20.

By forming the extending portion 21 and the first end portion 20*a* of the vibrating body 20 substantially at the same height, it is possible to reduce the amount of displacement by the vibration of the extending portion 21 and to improve the vibration performance of the vibrating device 1.

Piezoelectric Element

The piezoelectric element 30 is disposed at the second end portion 20*b* of the vibrating body 20. In the present example embodiment, the piezoelectric element 30 has a ring shape when viewed in the axial direction (the Z direction) of the vibrating body 20. The piezoelectric element 30 can be fixed to the second end portion 20*b* of the vibrating body 20 by using an adhesive, for example. The shape of the piezoelectric element 30 is not limited to the ring shape and may take on any shape that can vibrate the vibrating body 20.

The piezoelectric element 30 includes a piezoelectric body and an electrode. For example, as for a material of the piezoelectric body, it is possible to use appropriate piezoelectric ceramics such as barium titanate ($BaTiO_3$), lead zirconate titanate (PZT: $PbTiO_3 \cdot PbZrO_3$), lead titanate ($PbTiO_3$), lead metaniobate ($PbNb_2O_6$), bismuth titanate ($Bi_4Ti_3O_{12}$), and (K, Na) $NbO_3$, an appropriate piezoelectric single crystal such as $LiTaO_3$ and $LiNbO_3$, or the like.

The electrode may be a Ni electrode, for example. The electrode may be an electrode made of a thin film of a metal such as Ag or Au, which is formed in accordance with a sputtering method. Alternatively, the electrode can also be formed by plating or vapor deposition in addition to the sputtering method.

The piezoelectric element 30 is controlled by a controller, for example. The controller includes an excitation circuit to apply a driving signal to generate the vibration, for example. The excitation circuit is connected to the piezoelectric element 30 with a power-feeding conductor interposed therebetween, for example. The piezoelectric element 30 vibrates the vibrating body 20 in the thickness direction (the Z direction) of the vibrating device 1 based on the driving signal from the excitation circuit. Due to the vibration of the piezoelectric element 30, the vibrating body 20 is vibrated in the thickness direction (the Z direction). In the vibrating device 1, the light transmitting body 10 is vibrated by vibrating the vibrating body 20, thereby removing the foreign matter such as a water droplet adhering to the light transmitting body 10.

Figure 3:
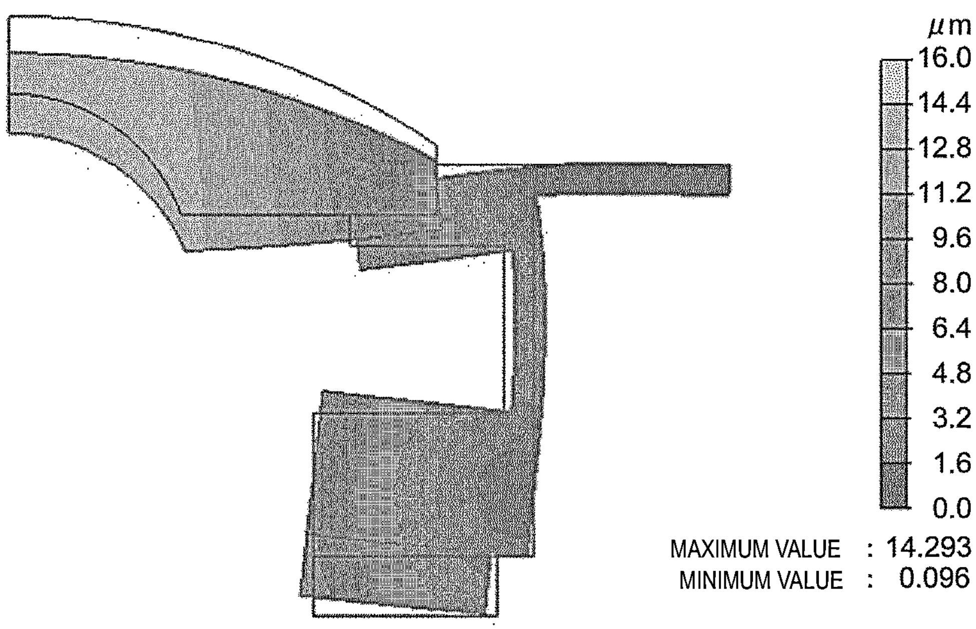
FIG. 3 is a diagram illustrating a simulation result of displacement amount distribution in the vibrating device of Example Embodiment 1 of the present invention.

FIG. 3 is a diagram illustrating a simulation result of displacement amount distribution in the vibrating device 1 of Example Embodiment 1. As for the simulation, a piezoelectric analysis (a resonance analysis) was carried out by using Femtet manufactured by Murata Software Co., Ltd. Example calculation conditions of the simulation of FIG. 3 are as follows. The material of the light transmitting body 10 corresponds to soda glass having the density of 2.48 g/cm$^3$ and the Young's modulus of 73 GPa. A diameter of the light transmitting body 10 is 14 mm. The material of the vibrating body 20 corresponds to SUS420J2 having the density of 7.75 g/cm$^3$ and the Young's modulus of 200 GPa. The piezoelectric element 30 has the density of 7.83 g/cm$^3$, and a voltage at 60 Vp-p is applied to upper and lower surfaces (a surface in contact with the vibrating body 20 and a surface on the opposite side therefrom) of the piezoelectric element 30. The piezoelectric element has an inside diameter of 16 mm, an inside diameter of 10 mm, and a thickness of 1 mm. In FIG. 3, a paler color indicates a larger amount of displacement.

As illustrated in FIG. 3, the extending portion 21 has the amount of displacement close to 0 and is hardly vibrated. This means that the extending portion 21 serves as the vibration node. On the other hand, a portion near the center of the light transmitting body 10 has the largest amount of displacement. This reveals that the vibration of the vibrating body 20 is transmitted to the light transmitting body 10 while reducing or preventing its leakage out to the extending portion 21. Accordingly, the foreign matter such as a water droplet or mud adhering to the light transmitting body 10 can be efficiently removed.

Figure 4A:
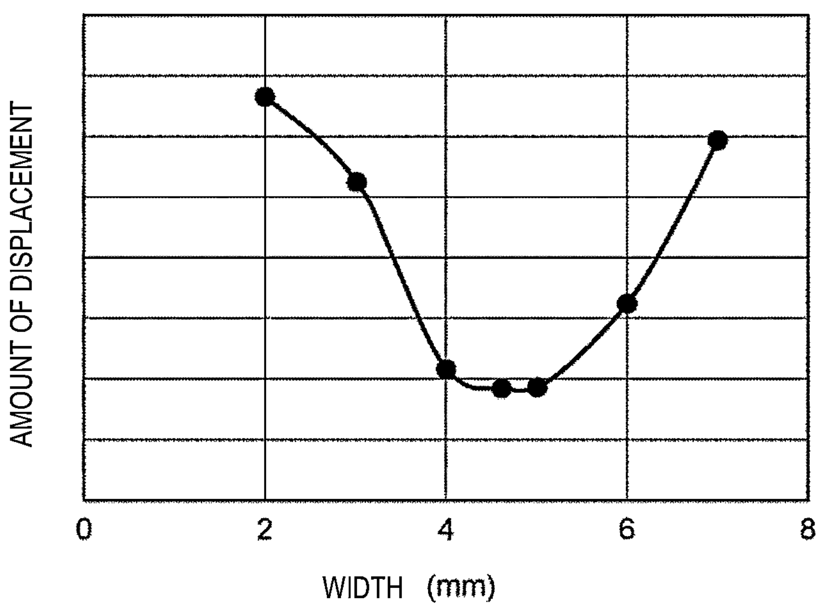
FIG. 4A is a graph depicting a width dependency of an amount of displacement of an extending portion.
Figure 4B:
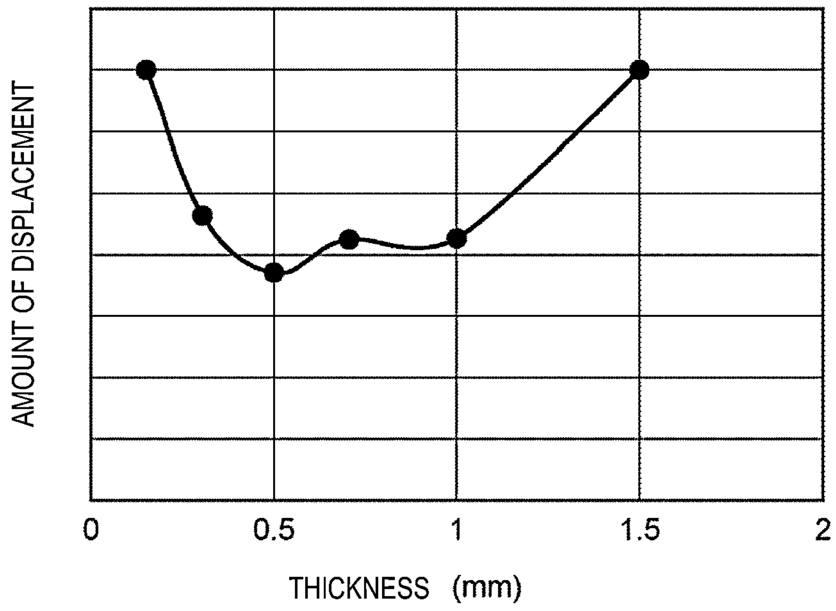
FIG. 4B is a graph depicting a thickness dependency of the amount of displacement of the extending portion.

FIG. 4A is a graph depicting a width dependency of the amount of displacement of the extending portion 21. FIG. 4B is a graph depicting a thickness dependency of the amount of displacement of the extending portion 21. FIG. 4A depicts the dependency of the amount of displacement of the extending portion 21 on the width w1 (see FIG. 1) when the thickness t1 (see FIG. 1) of the extending portion 21 is fixed to about 0.5 mm, for example. FIG. 4B depicts the dependency of the amount of displacement of the extending portion 21 on the thickness t1 when the width w1 of the extending portion 21 is fixed to about 4.6 mm, for example. As for the amounts of displacement in the graphs of FIG. 4A and FIG. 4B, the maximum amounts of displacement of the extending portion 21 are calculated.

As depicted in FIG. 4A, the amount of displacement of the extending portion 21 can be reduced to a small value when the width w1 of the extending portion 21 is equal to or above about 4 mm and equal to or below about 6 mm, for example. Accordingly, the width w1 of the extending portion 21 may preferably be equal to or above about 4 mm and equal to or below about 6 mm, for example. Meanwhile, the amount of displacement of the extending portion 21 becomes the smallest when the width w1 of the extending portion 21 is about 4.6 mm, for example. Accordingly, the width w1 of the extending portion 21 may more preferably be about 4.6 mm, for example.

As depicted in FIG. 4B, the amount of displacement of the extending portion 21 can be reduced to a small value when the thickness t1 of the extending portion 21 is equal to or above about 0.25 mm and equal to or below about 1 mm, for example. Accordingly, the thickness t1 of the extending portion 21 may preferably be equal to or above about 0.25 mm and equal to or below about 1 mm, for example. Meanwhile, the amount of displacement of the extending portion 21 becomes the smallest when the thickness t1 of the extending portion 21 is about 0.5 mm, for example. Accordingly, the thickness t1 of the extending portion 21 may more preferably be about 0.5 mm, for example.

Advantageous Effects

The following advantageous effects can be achieved by the vibrating device 1 according to Example Embodiment 1.

The vibrating device 1 includes the light transmitting body 10, the vibrating body 20, the extending portion 21, and the piezoelectric element 30. The vibrating body 20 is the tubular structure including the first end portion 20*a*, the second end portion 20*b*, and the side wall 20*c* joining the first end portion 20*a* to the second end portion 20*b*, which is connected to the light transmitting body 10 with the first end portion 20*a* and vibrates the light transmitting body 10. The extending portion 21 extends outward from the side wall 20*c* of the vibrating body 20. The piezoelectric element 30 is disposed at the second end portion 20*b* of the vibrating body 20.

According to the above-described configuration, it is possible to provide the vibrating device that can efficiently vibrate the light transmitting body 10. Since the extending portion 21 serves as the vibration node, it is possible to efficiently vibrate the light transmitting body 10. Meanwhile, even when the foreign matter such as a water droplet adheres to the extending portion 21, it is possible reduce the effect on the vibration of the light transmitting body 10 since the extending portion 21 serves as the vibration node. In the meantime, even when there is a manufacturing variation, it is possible to transmit the vibration efficiently to the light transmitting body 10 by providing the extending portion 21 with the node.

The extending portion 21 extends outward from the first end portion 20*a* of the vibrating body 20. According to the above-described configuration, it is possible to reduce the amount of displacement by the vibration of the extending portion 21 and to improve the vibration performance of the vibrating device 1.

The above-described example embodiment has been described as an example in which the extending portion 21 has a ring shape. However, the shape of the extending portion 21 is not limited to this shape. The extending portion 21 may have any shape as long as the extending portion 21 extends outward from the side wall 20*c* of the vibrating body 20.

The imaging device 100 includes the vibrating device 1, and the imaging element 60 disposed inside the vibrating device 1.

According to the above-described configuration, it is possible to provide the imaging device 100 having high reliability.

Modifications

Figure 5:
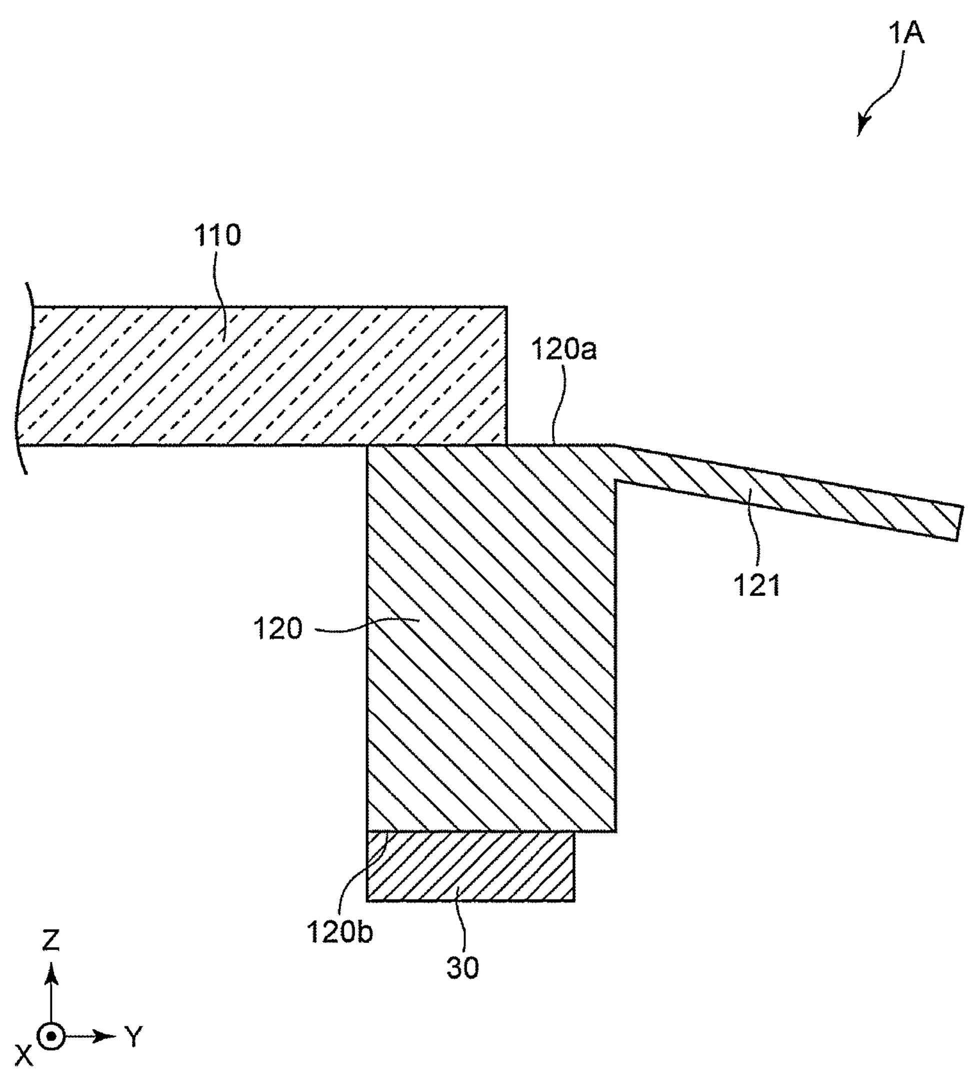
FIG. 5 is a partial cross-sectional view illustrating a vibrating device according to Modification 1 of Example Embodiment 1 of the present invention.

FIG. 5 is a partial cross-sectional view illustrating a vibrating device 1A according to Modification 1 of Example Embodiment 1. As illustrated in FIG. 5, an extending portion 121 may be bent toward a second end portion 120*b* side of a vibrating body 120. Meanwhile, the vibrating body 120 may be have a tubular shape without a first projecting portion or a second projecting portion. In addition, a light transmitting body 110 may have a plate shape. In this case, it is possible to achieve the same effects as those of Example Embodiment 1 with a simple configuration.

Figure 6:
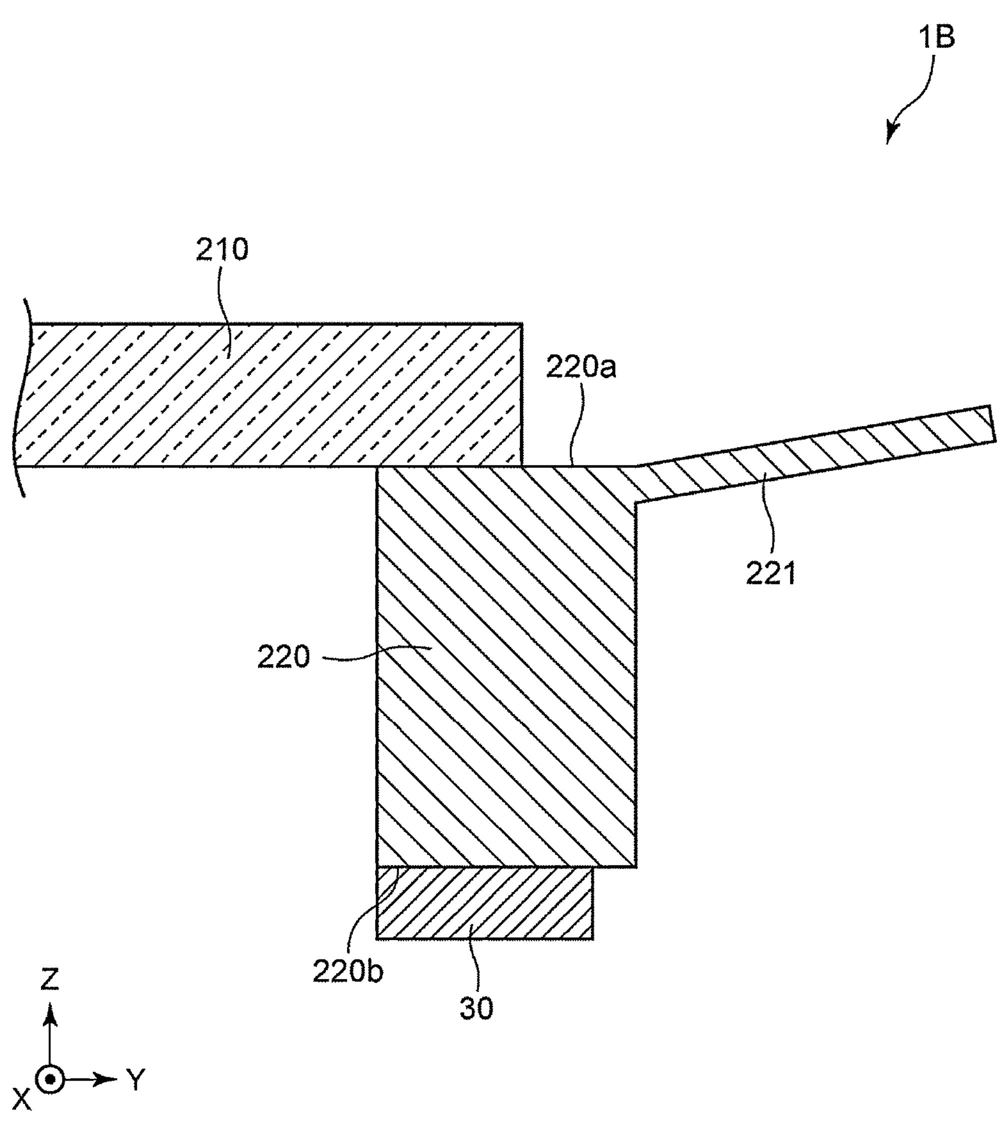
FIG. 6 is a partial cross-sectional view illustrating a vibrating device according to Modification 2 of Example Embodiment 1 of the present invention.

FIG. 6 is a partial cross-sectional view illustrating a vibrating device 1B according to Modification 2 of Example Embodiment 1. As illustrated in FIG. 6, an extending portion 221 may be bent toward first end portion 220*a* side of a vibrating body 220. In this case, it is possible to achieve the same effects as those of Example Embodiment 1 with a simple configuration.

Figure 7:
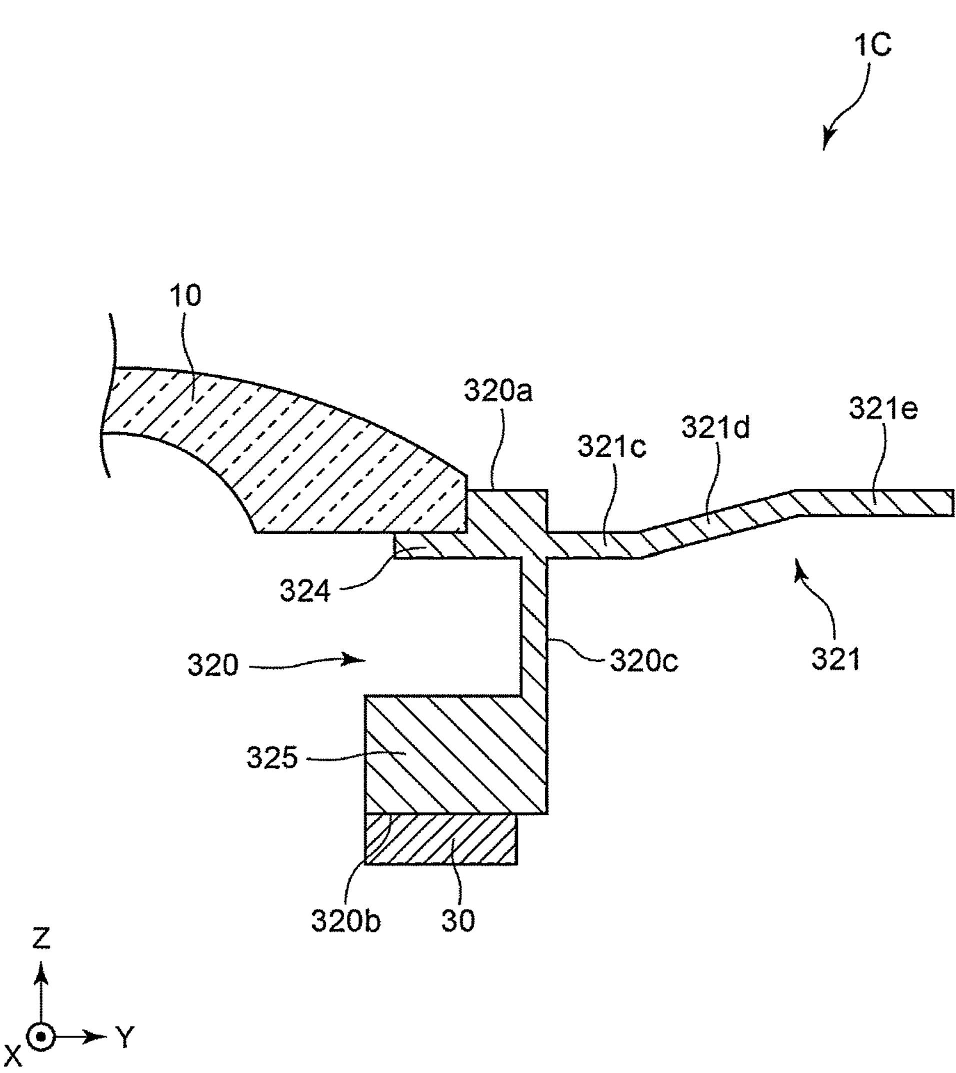
FIG. 7 is a partial cross-sectional view illustrating a vibrating device according to Modification 3 of Example Embodiment 1 of the present invention.

FIG. 7 is a partial cross-sectional view illustrating a vibrating device 1C according to Modification 3 of Example Embodiment 1. As illustrated in FIG. 7, an extending portion 321 may extend outward from first end portion 320*a* side of a vibrating body 320. In the vibrating device 1C, the extending portion 321 extends outward from a side wall 320*c* on the first end portion 320*a* side of the vibrating body 320. Moreover, the extending portion 321 includes a first portion 321*c*, a second portion 321*d*, and a third portion 321*e*. The first portion 321*c* extends from the side wall 320*c* of the vibrating body 320 in a direction orthogonal to an axial direction (the Z direction) of the vibrating body 320. The second portion 321*d* extends from the first portion 321*c* toward the first end portion 320*a* side. The third portion 321*e* extends from the second portion 321*d* in the direction orthogonal to the axial direction (the Z direction) of the vibrating body 320. According to the above-described configuration, a water droplet or the like adhering to the extending portion 321 is more likely to flow out. Here, the second portion 321*d* may extend from the first portion 321*c* toward a second end portion 320*b* side instead.

Meanwhile, in the vibrating device 1C of FIG. 7, the vibrating body 320 includes a first projecting portion 324 that projects inward from the first end portion 320*a*, and a second projecting portion 325 that projects inward from the second end portion 320*b*. In the vibrating device 1C, the extending portion 321 and a portion of the second projecting portion 325 serve as a vibration node. Accordingly, it is possible to connect a structure such as a holding portion to the second projecting portion 325 without affecting the vibration of the light transmitting body 10.

Example Embodiment 2

A vibrating device according to Example Embodiment 2 of the present invention will be described. Note that different features from those of Example Embodiment 1 will be mainly described in Example Embodiment 2. In Example Embodiment 2, elements and features identical or equivalent to those of Example Embodiment 1 will be denoted by the same reference signs and explained accordingly. Moreover, descriptions overlapping those in Example Embodiment 1 will be omitted in Example Embodiment 2.

Figure 8:
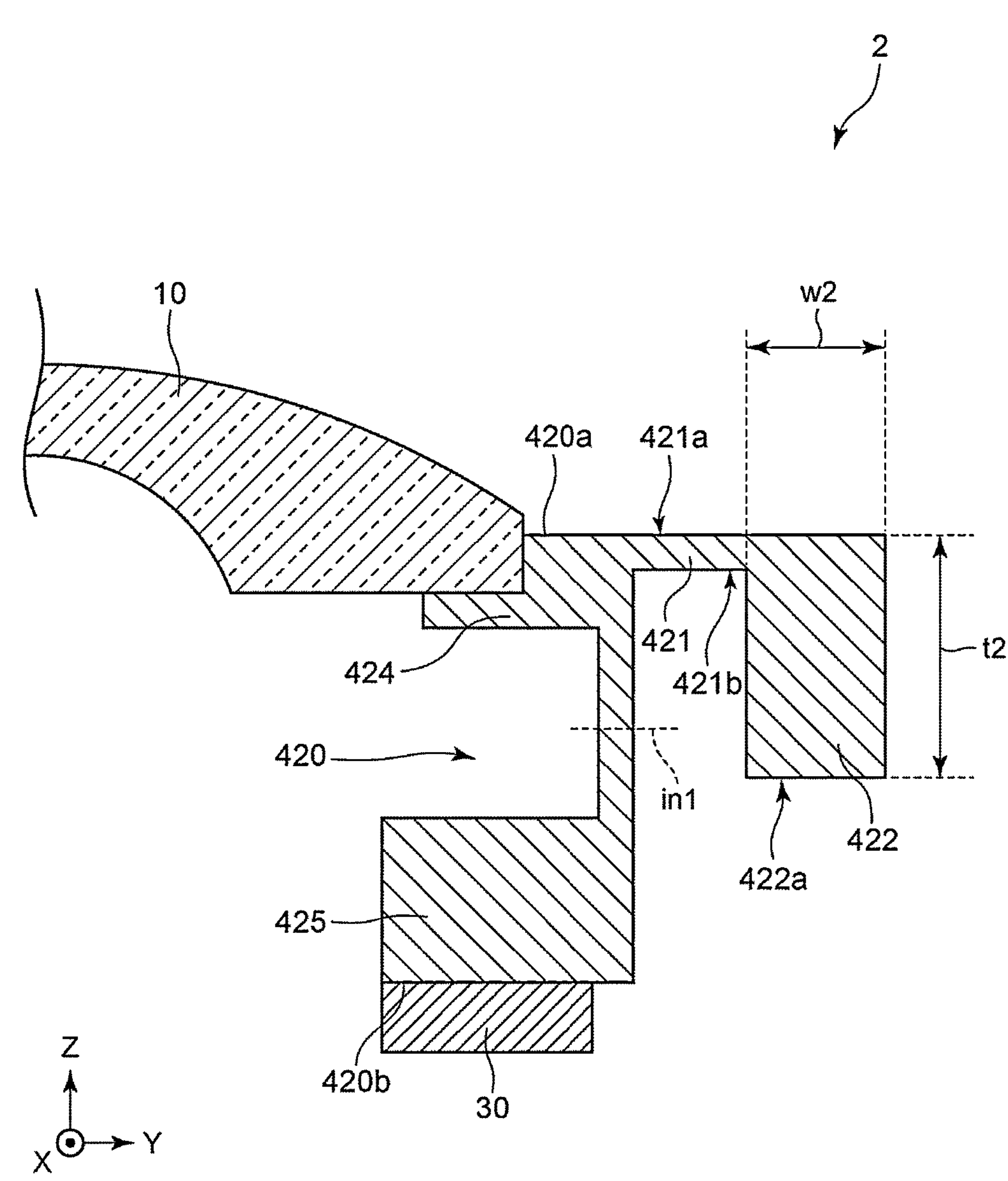
FIG. 8 is a partial cross-sectional view illustrating a vibrating device according to Example Embodiment 2 of the present invention.

FIG. 8 is a partial cross-sectional view illustrating a vibrating device 2 according to Example Embodiment 2. The Example Embodiment 2 is different from Example Embodiment 1 in that a weight 422 is provided at a tip of an extending portion 421.

In the present example embodiment, the weight 422 is disposed along an outer periphery of a second surface 421*b* of the extending portion 421. The weight 422 has a ring shape extending along the outer periphery of the second surface 421*b* of the extending portion 421. The weight can be formed from the same material as the extending portion 421, for example. Although the extending portion 421 and the weight 422 are integrally formed in the present embodiment, the extending portion 421 and the weight 422 may be formed from different members. In this case, the weight 422 formed from a different member may be attached to the extending portion 421.

By disposing the weight 422 at the extending portion 421, it is possible to further reduce the amount of displacement of the extending portion 421 and to transmit vibration of a vibrating body 420 efficiently to the light transmitting body 10. The amount of displacement of the extending portion 421 can be reduced by disposing the weight 422 at the extending portion 421 having a plate shape and thus adding a weight thereto. As a consequence, it is possible to improve the vibration performance of the vibrating device 2.

Figure 9A:
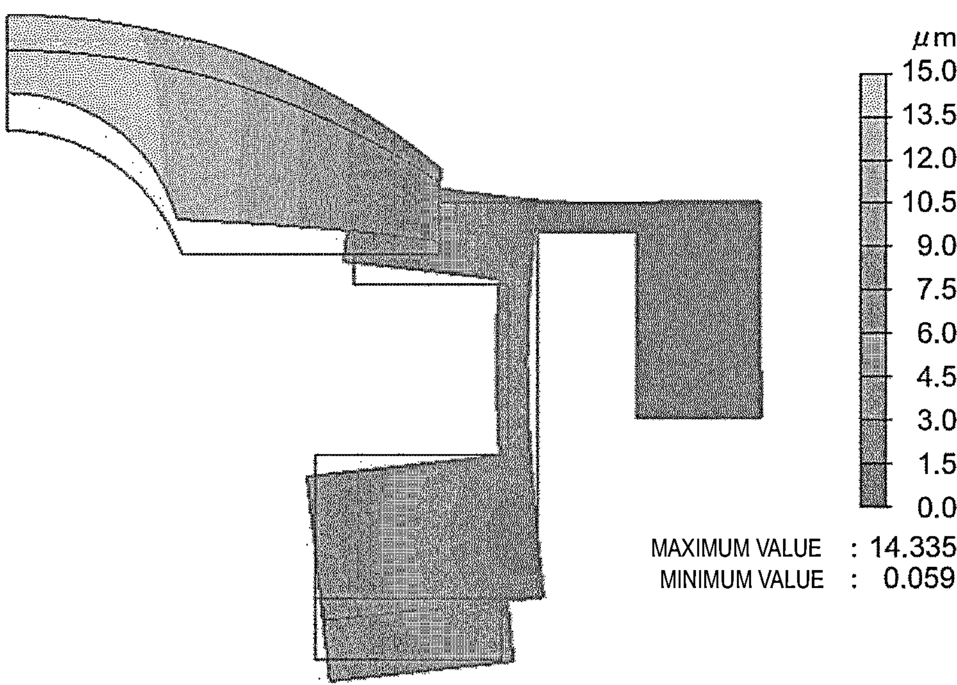
FIG. 9A is a diagram illustrating a simulation result of displacement amount distribution in the vibrating device of FIG. 8.

As illustrated in FIG. 8, the vibrating device 2 has a configuration in which the weight 422 is disposed at the extending portion 421 that extends from first end portion 420*a* of the vibrating body 420. FIG. 9A is a diagram illustrating a simulation result of displacement amount distribution in the vibrating device 2 of FIG. 8. As for the simulation, a piezoelectric analysis (a resonance analysis) was carried out by using Femtet manufactured by Murata Software Co., Ltd. Example calculation conditions of the simulation of FIG. 9A are as follows. The material of the light transmitting body 10 corresponds to soda glass having the density of 2.48 $g/cm^3$ and the Young's modulus of 73 GPa. The diameter of the light transmitting body 10 is 14 mm. The material of the vibrating body 420 corresponds to SUS420J2 having the density of 7.75 $g/cm^3$ and the Young's modulus of 200 GPa. The piezoelectric element 30 has the density of 7.83 $g/cm^3$, and a voltage at 60 Vp-p is applied to upper and lower surfaces (a surface in contact with the vibrating body 420 and a surface on the opposite side therefrom) of the piezoelectric element 30. The piezoelectric element 30 has a contour of about 16 mm, an inside diameter of about 10 mm, and a thickness of about 1 mm, for example. In FIG. 9A, a paler color indicates a larger amount of displacement.

As illustrated in FIG. 9A, the extending portion 421 and the weight 422 in the vibrating device 2 turn out to be the vibration nodes. Meanwhile, by disposing the weight 422 at the extending portion 421, it is possible to further reduce the amount of displacement of the extending portion 421 as compared to the case where the extending portion 421 is not provided with the weight. In the meantime, since the weight 422 serves as the vibration node in addition to the extending portion 421, it is possible to transmit the vibration of the vibrating body 420 to the light transmitting body 10 more efficiently. In addition, since the weight 422 also serves as the vibration node, the vibration performance can be maintained without affecting the vibration of the vibrating device 2 even when foreign matter adheres to the weight 422.

Figure 9B:
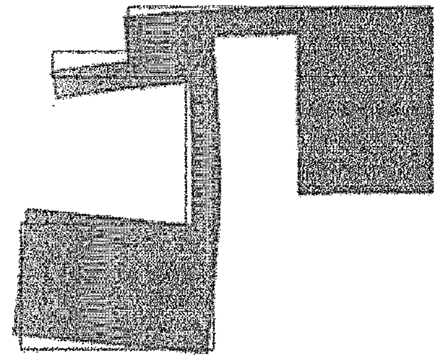
FIG. 9B is a diagram illustrating a resonance analysis result of a vibrating body of the vibrating device.
Figure 9C:
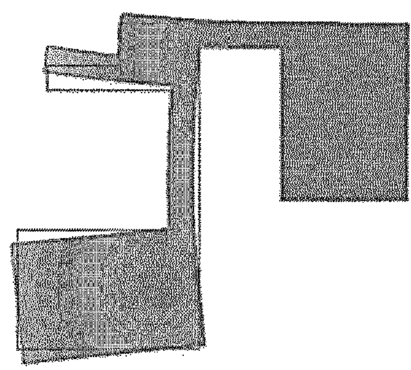
FIG. 9C is a diagram illustrating a resonance analysis result of the vibrating body of the vibrating device.

FIGS. 9B and 9C are diagrams illustrating resonance analysis results of the vibrating body 420 of the vibrating device 2. FIG. 9B illustrates a case where a phase is 0° while FIG. 9C illustrates a case where the phase is 180°. In the case of the configuration in which the vibrating body 420 includes a first projecting portion 424 and a second projecting portion 425, the vibrating body 420 vibrates in a tuning fork resonant mode. In this case, two nodes are defined in the vibrating body 420 symmetrically with respect to an intermediate position in1 (see FIG. 8) between the first projecting portion 424 and the second projecting portion 425. Of the two nodes, one node is the extending portion 421 and the weight 422 while the other node is a portion of the second projecting portion 425.

Figure 10A:
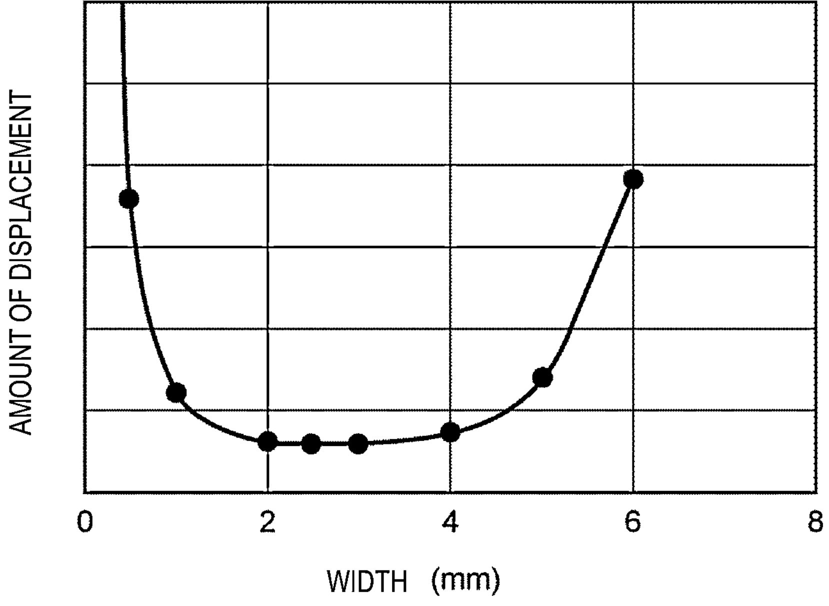
FIG. 10A is a graph depicting a width dependency of an amount of displacement of a weight.
Figure 10B:
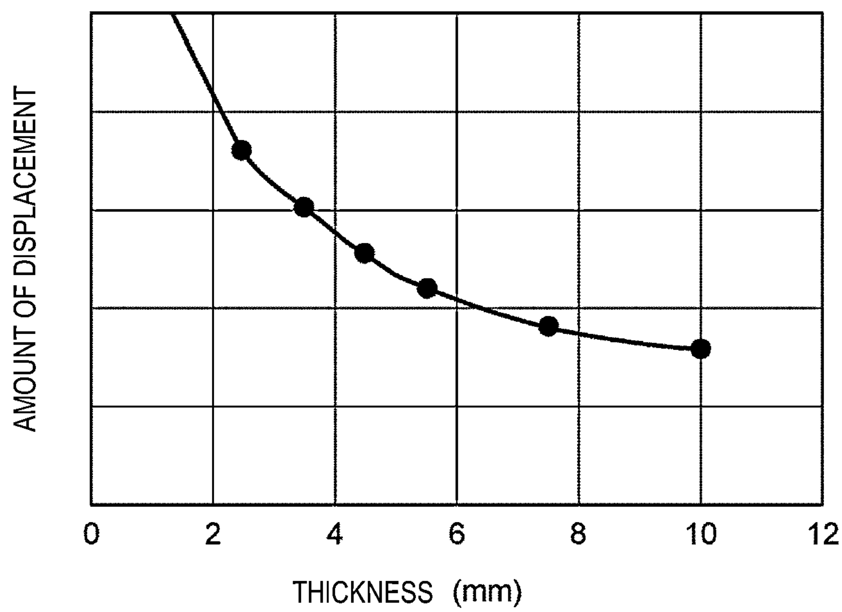
FIG. 10B is a graph depicting a thickness dependency of the amount of displacement of the weight.

FIG. 10A is a graph depicting a width dependency of an amount of displacement of the weight 422. FIG. 10B is a graph depicting a thickness dependency of the amount of displacement of the weight 422. FIG. 10A depicts the dependency on a width w2 (see FIG. 8) of the weight 422 when a thickness t2 (see FIG. 8) of the weight 422 is fixed to about 3.5 mm, for example. FIG. 10B depicts the dependency on the thickness t2 of the weight 422 when the width w2 of the weight 422 is fixed to about 2.5 mm, for example. As for the amounts of displacement in the graphs of FIGS. 10A and 10B, the maximum amounts of displacement of the weight 422 are calculated. The width w2 of the weight 422 is equivalent to a length of the weight 422 in an outward direction from a side wall 420*c* of the vibrating body 420. The thickness t2 of the weight 422 is equivalent to a length from a first surface 421*a* of the extending portion 421 to a lower end portion 422*a* (see FIG. 8) of the weight 422.

As depicted in FIG. 10A, the amount of displacement of the weight 422 can be reduced to a small value when the width w2 of the weight 422 is equal to or above about 1 mm and equal to or below about 5 mm, for example. Accordingly, the width w2 of the weight 422 may preferably be equal to or above about 1 mm and equal to or below about 5 mm, for example. Meanwhile, the amount of displacement of the weight 422 becomes the smallest when the width w2 of the weight 422 is about 2.5 mm, for example. Accordingly, the width w2 of the weight 422 may more preferably be about 2.5 mm.

As depicted in FIG. 10B, the amount of displacement of the weight 422 becomes smaller as the thickness t2 of the weight 422 grows larger. Accordingly, it is possible to provide a favorable node while reducing or preventing the amount of displacement to a small value as the thickness t2 of the weight 422 is set larger. As a consequence, the thickness t2 of the weight 422 can be set to any value based on trade-off between the size of the vibrating device 2 and the vibration performance.

Advantageous Effects

The following advantageous effects can be achieved by the vibrating device 2 according to Example Embodiment 2.

In the vibrating device 2, the weight 422 is disposed at the second surface 421*b* of the extending portion 421 on a second end portion 420*b* side of the vibrating body 420.

According to the above-described configuration, it is easier to provide the extending portion 421 with the vibration node, so that the vibration efficiency can further be improved.

Since it is easier to provide the extending portion 421 with the vibration node by disposing the weight 422 at the extending portion 421, the vibration of the vibrating body 420 can be transmitted to the light transmitting body 10 more efficiently. In addition, since the weight 422 also serves as the vibration node, the vibration performance can be maintained without affecting the vibration of the vibrating device 2 even when foreign matter adheres to the weight 422.

The above-described example embodiment has been described with respect to an example in which the weight 422 is disposed at the second surface 421*b* of the extending portion 421. However, the present invention is not limited to this configuration. The weight 422 only needs to be disposed at any one of the first surface 421*a* on the first end portion 420*a* side or the second surface 421*b* on the second end portion 420*b* side of the extending portion 421.

Meanwhile, the above-described example embodiment has been described with respect to an example in which the single weight 422 is disposed at the extending portion 421. However, the present invention is not limited to this configuration. More than one weight may be disposed at any one of the first surface 421*a* or the second surface 421*b* of the extending portion 421. In this case, the respective weights may preferably be disposed at regular intervals.

Modifications

Figure 11:
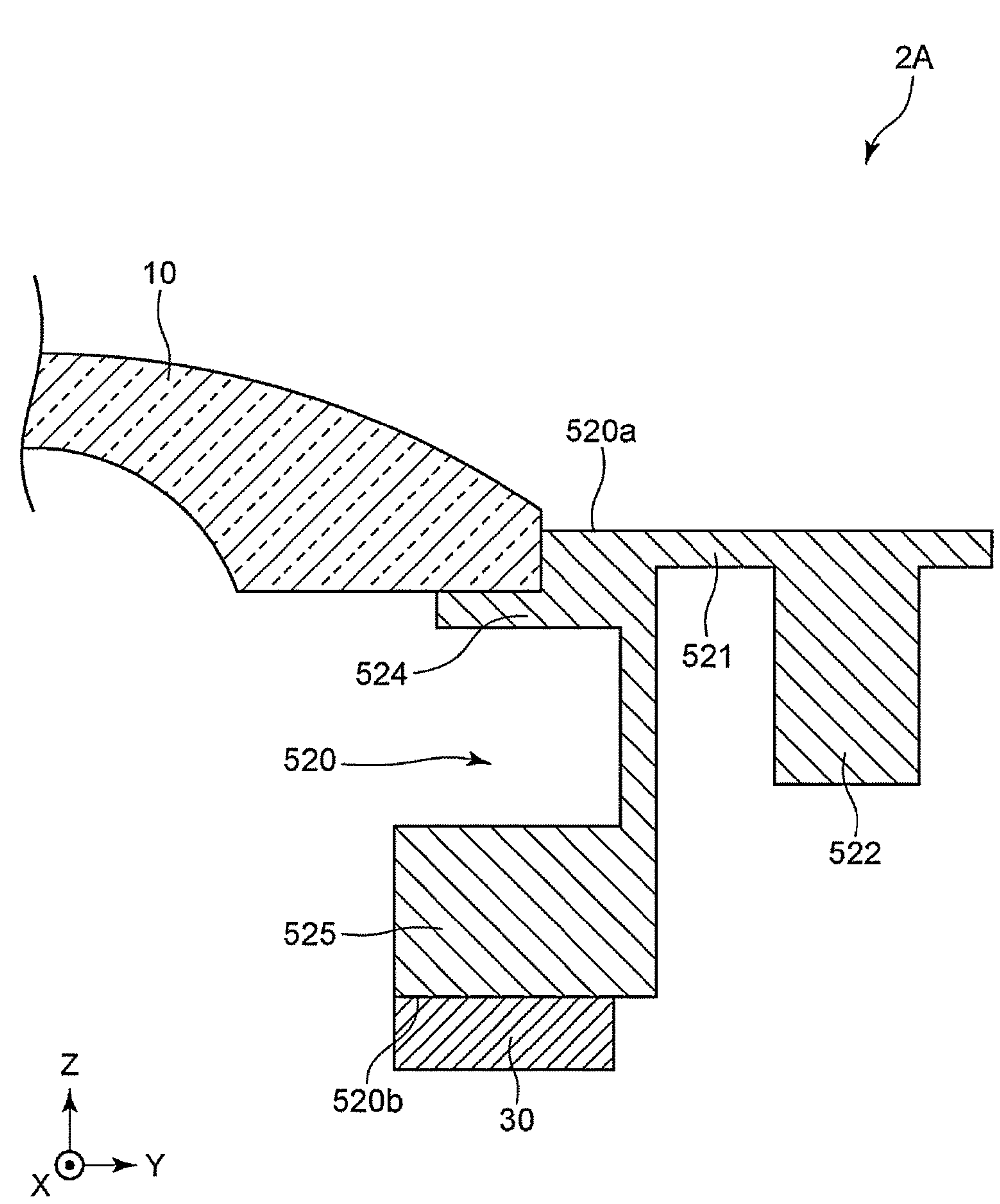
FIG. 11 is a partial cross-sectional view illustrating a vibrating device according to Modification 1 of Example Embodiment 2 of the present invention.

FIG. 11 is a partial cross-sectional view illustrating a vibrating device 2A according to Modification 1 of Example Embodiment 2. As illustrated in FIG. 11, a weight 522 may be disposed at a position other than a tip of an extending portion 521. This configuration can also achieve the same effects as those of Example Embodiment 2.

Figure 12:
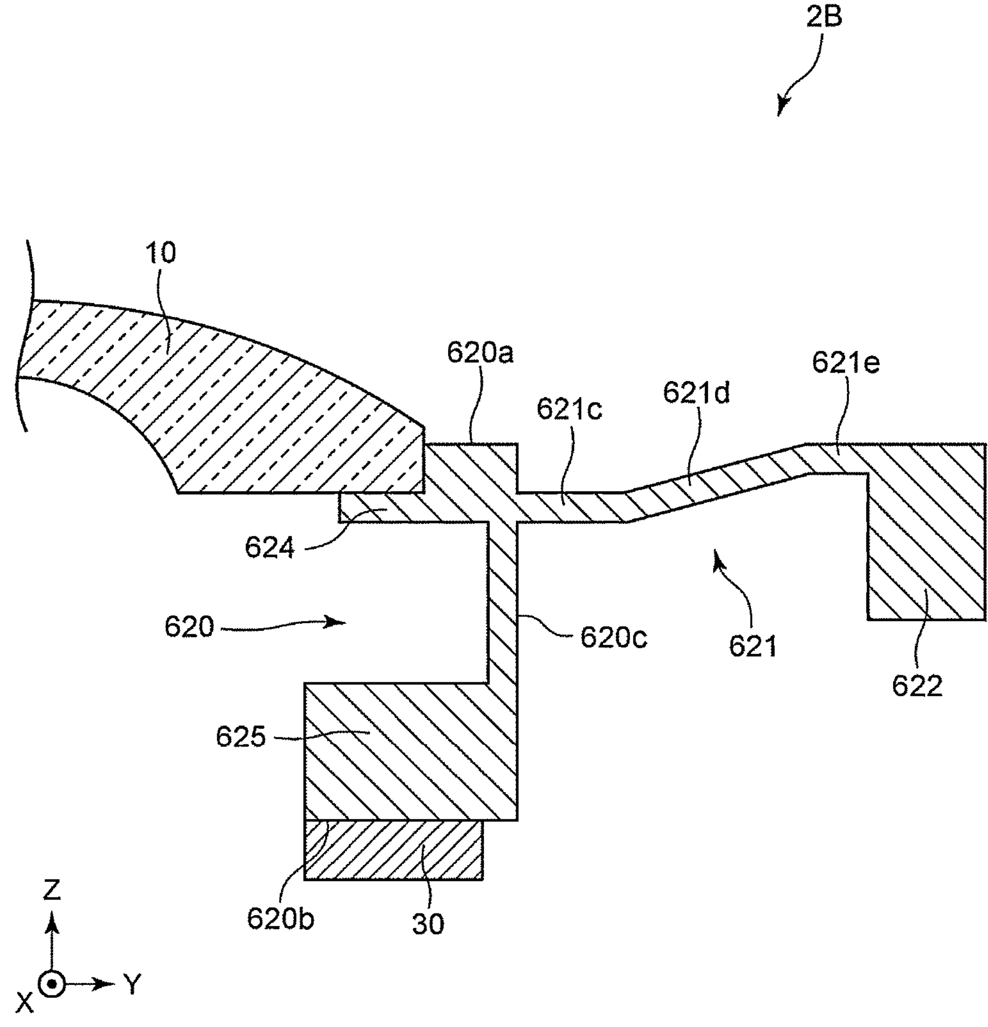
FIG. 12 is a partial cross-sectional view illustrating a vibrating device according to Modification 2 of Example Embodiment 2 of the present invention.

FIG. 12 is a partial cross-sectional view illustrating a vibrating device 2B according to Modification 2 of Example Embodiment 2. As illustrated in FIG. 12, an extending portion 621 may be configured to include a first portion 621*c*, a second portion 621*d*, and a third portion 621*e*, and a weight 622 may be disposed at the third portion 621*e*. According to the above-described configuration, a water droplet or the like adhering to the extending portion 621 is more likely to flow out.

Example Embodiment 3

A vibrating device 3 according to Example Embodiment 3 of the present invention will be described. Note that different features from those of Example Embodiment 2 will be mainly described in Example Embodiment 3. In Example Embodiment 3, elements or features identical or equivalent to those of Example Embodiment 2 will be denoted by the same reference signs and explained accordingly. Moreover, descriptions overlapping those in Example Embodiment 2 will be omitted in Example Embodiment 3.

Figure 13:
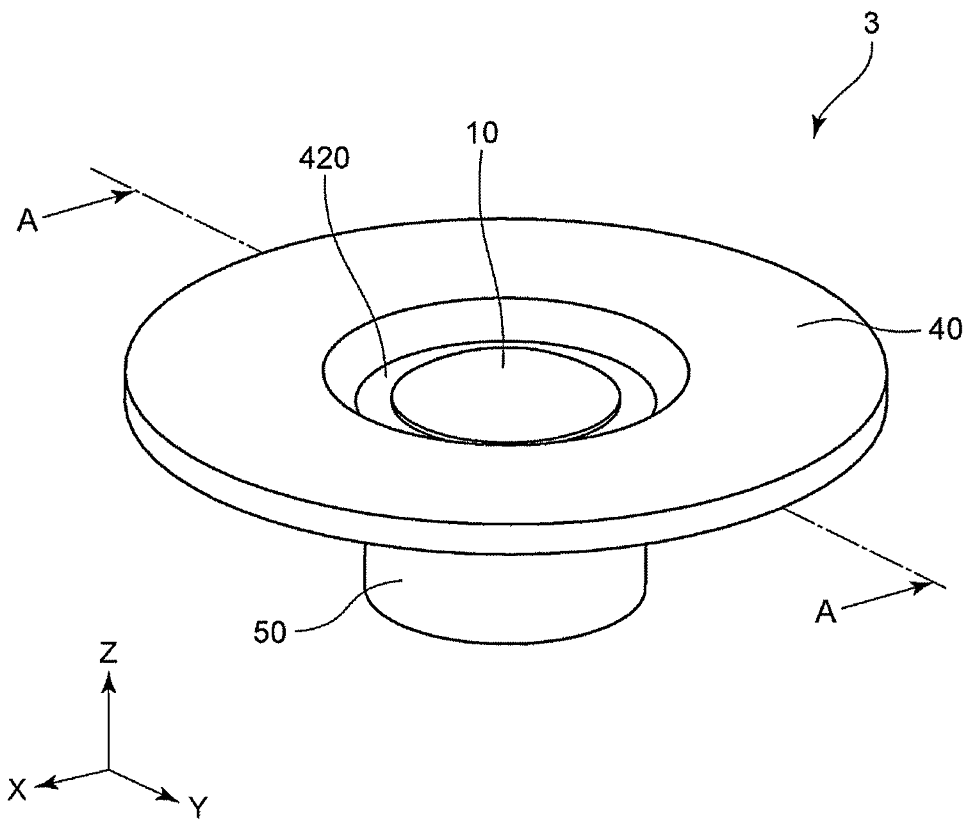
FIG. 13 is a perspective view illustrating a vibrating device according to Example Embodiment 3.
Figure 14:
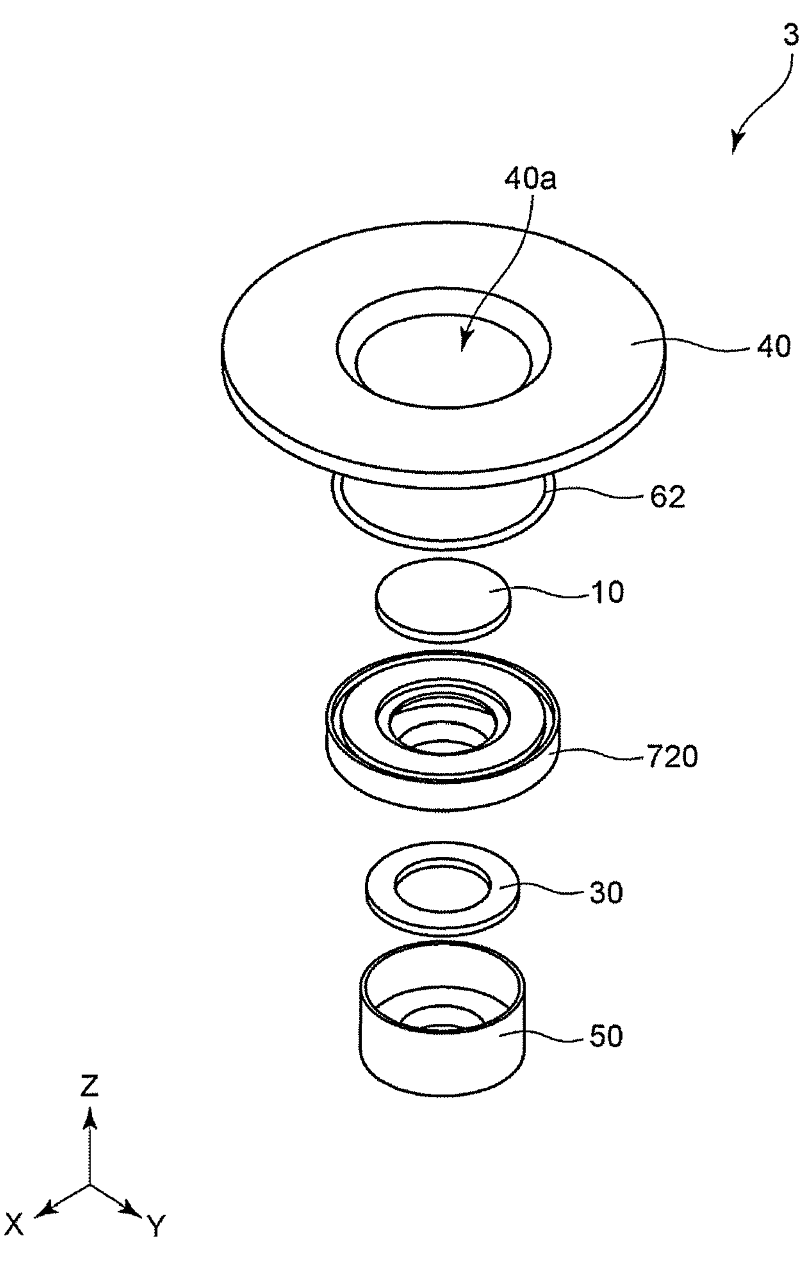
FIG. 14 is an exploded view of the vibrating device of FIG. 13.
Figure 15:
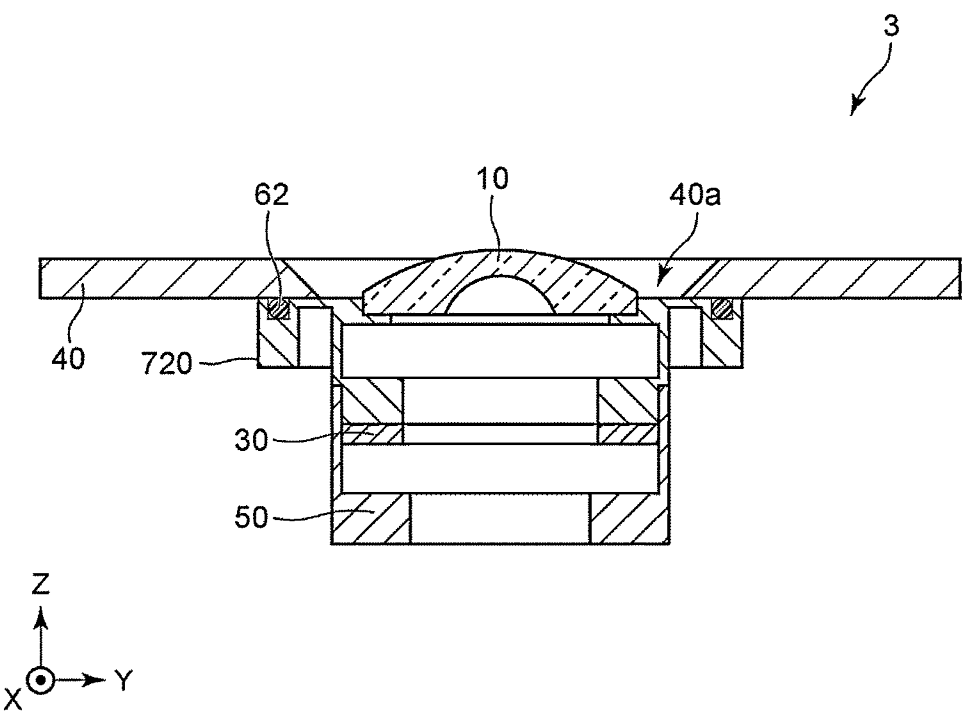
FIG. 15 is a cross-sectional view taken along line A-A of the vibrating device of FIG. 13.
Figure 16:
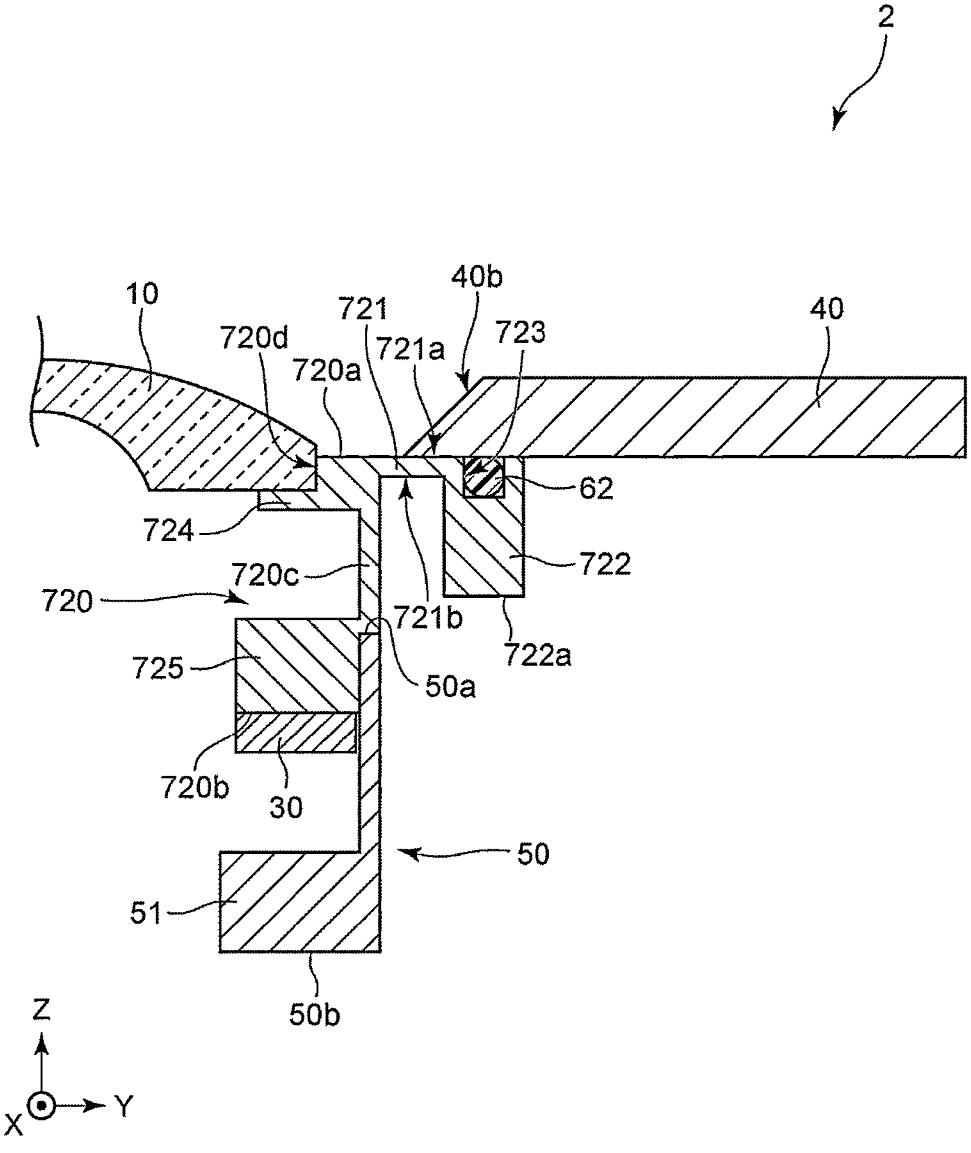
FIG. 16 is a partially enlarged view of the vibrating device of FIG. 15.

FIG. 13 is a perspective view illustrating the vibrating device 3 according to Example Embodiment 3. FIG. 14 is an exploded view of the vibrating device 3 of FIG. 13. FIG. 15 is a cross-sectional view taken along line A-A of the vibrating device 3 of FIG. 13. FIG. 16 is a partially enlarged view of the vibrating device 3 of FIG. 15.

As illustrated in FIGS. 13 to 16, the vibrating device 3 according to Example Embodiment 3 is different from Example Embodiment 2 in that the vibrating device 3 includes a cover 40 and a holding portion 50. Moreover, the vibrating device 3 according to Example Embodiment 3 is different from Example Embodiment 2 in that a weight 722 is provided with a groove 723 and a seal 62 is disposed in the groove 723.

As illustrated in FIG. 16, the groove 723 is formed in a surface of the weight 722 (a first surface 721*a* of an extending portion 721). The groove 723 has a ring shape along an outer periphery of the weight 722 when viewed in an axial direction (the Z direction) of a vibrating body 720. The seal 62 is disposed in the groove 723. The seal 62 is an elastic member such as an O-ring, for example.

Cover

The cover 40 reduces or prevents entry of foreign matter into the vibrating device 3. The cover 40 is provided with a hole 40*a* to expose the light transmitting body 10. The cover 40 is disposed outside the light transmitting body 10 and is fitted to the extending portion 721 to come into contact with a surface of the weight 722.

As illustrated in FIG. 14, in the present example embodiment, the cover 40 has a plate shape provided with the hole 40*a*. In the present example embodiment, the vibrating device 3 may have a waterproof structure by bringing the cover 40 into contact with the extending portion 721.

Meanwhile, as illustrated in FIG. 16, an end portion 40*b* on the hole 40*a* side of the cover 40 is formed into a tapered shape such that its thickness gradually decreases toward the light transmitting body 10. By forming the end portion 40*b* of the cover 40 into the above-mentioned shape, it is possible to cover the vibrating device 3 without damaging a view angle of the imaging element, thereby achieving both the performance and reliability of the vibrating device 3.

Figure 17:
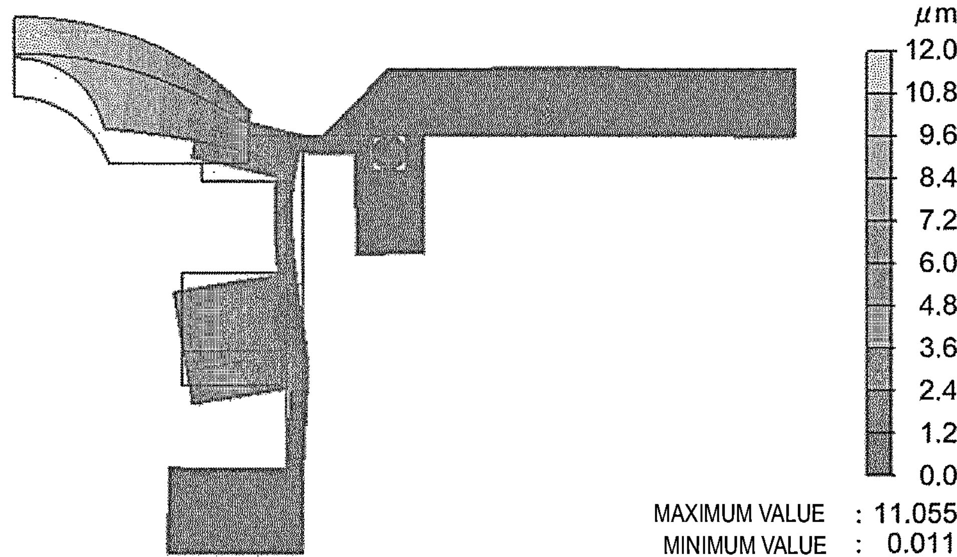
FIG. 17 is a diagram illustrating a simulation result of displacement amount distribution in the vibrating device of Example Embodiment 3 of the present invention.

FIG. 17 is a diagram illustrating a simulation result of displacement amount distribution in the vibrating device 3 of Example Embodiment 3. As for the simulation, a piezoelectric analysis (a resonance analysis) was carried out by using Femtet manufactured by Murata Software Co., Ltd. Example calculation conditions of the simulation of FIG. 17 are as follows. The material of the light transmitting body 10 corresponds to soda glass having the density of 2.48 g/cm$^3$ and the Young's modulus of 73 GPa. The diameter of the light transmitting body 10 is 14 mm. The material of the vibrating body 20 corresponds to SUS420J2 having the density of 7.75 g/cm$^3$ and the Young's modulus of 200 GPa. The piezoelectric element 30 has the density of 7.83 g/cm$^3$, and a voltage at 60 Vp-p is applied to the upper and lower surfaces (the surface in contact with the vibrating body 20 and the surface on the opposite side therefrom) of the piezoelectric element 30. The piezoelectric element has a contour of about 16 mm, an inside diameter of about 10 mm, and a thickness of about 1 mm, for example. In FIG. 17, a paler color indicates a larger amount of displacement.

As illustrated in FIG. 17, the extending portion 721 and the weight 722 have the amounts of displacement close to 0 and are hardly vibrated. On the other hand, the portion near the center of the light transmitting body 10 has the largest amount of displacement. This reveals that the vibration of the vibrating body 20 is transmitted to the light transmitting body 10 while suppressing its leakage out to the extending portion 721. Accordingly, the foreign matter such as a water droplet adhering to the light transmitting body 10 can be efficiently removed. As described above, the extending portion 721 serves as the vibration node. In the present example embodiment, the cover 40 is brought into contact with the portion serving as the vibration node. Thus, a waterproof structure can be realized while maintaining the vibration performance of the vibrating device 3.

Meanwhile, according to FIG. 17, a portion of a second projecting portion 725 of the vibrating body 720 also serves as the vibration node. For this reason, it is possible to form a structure to hold the vibrating device 3 while reducing or preventing an influence on the vibration performance of the vibrating device 3 by connecting the holding portion 50 to the portion of the second projecting portion 725.

Advantageous Effects

The following advantageous effects can be achieved by the vibrating device 3 according to Example Embodiment 3.

The vibrating device 3 further includes the cover 40 which is provided with the hole 40*a* to expose the light transmitting body 10, disposed outside the light transmitting body 10 and fitted to the extending portion 721, thus coming into contact with the single weight 722. The single weight 722 preferably has a closed shape. The seal 62 is disposed in the groove 723 provided in the surface of the single weight 722.

According to the above-described configuration, it is possible to reduce or prevent entry of the foreign matter such as a water droplet into the vibrating device 3 while maintaining the vibration performance of the vibrating device 3 and to improve reliability of the vibrating device 3, or more specifically, a waterproof performance thereof.

The end portion 40*b* on the hole 40*a* side of the cover 40 may have a tapered shape with its thickness gradually reduced toward the light transmitting body 10.

The end portion 40*b* of the cover 40 may have an appropriate shape in accordance with the view angle of the imaging element disposed inside the vibrating device 3.

Modifications

Figure 18:
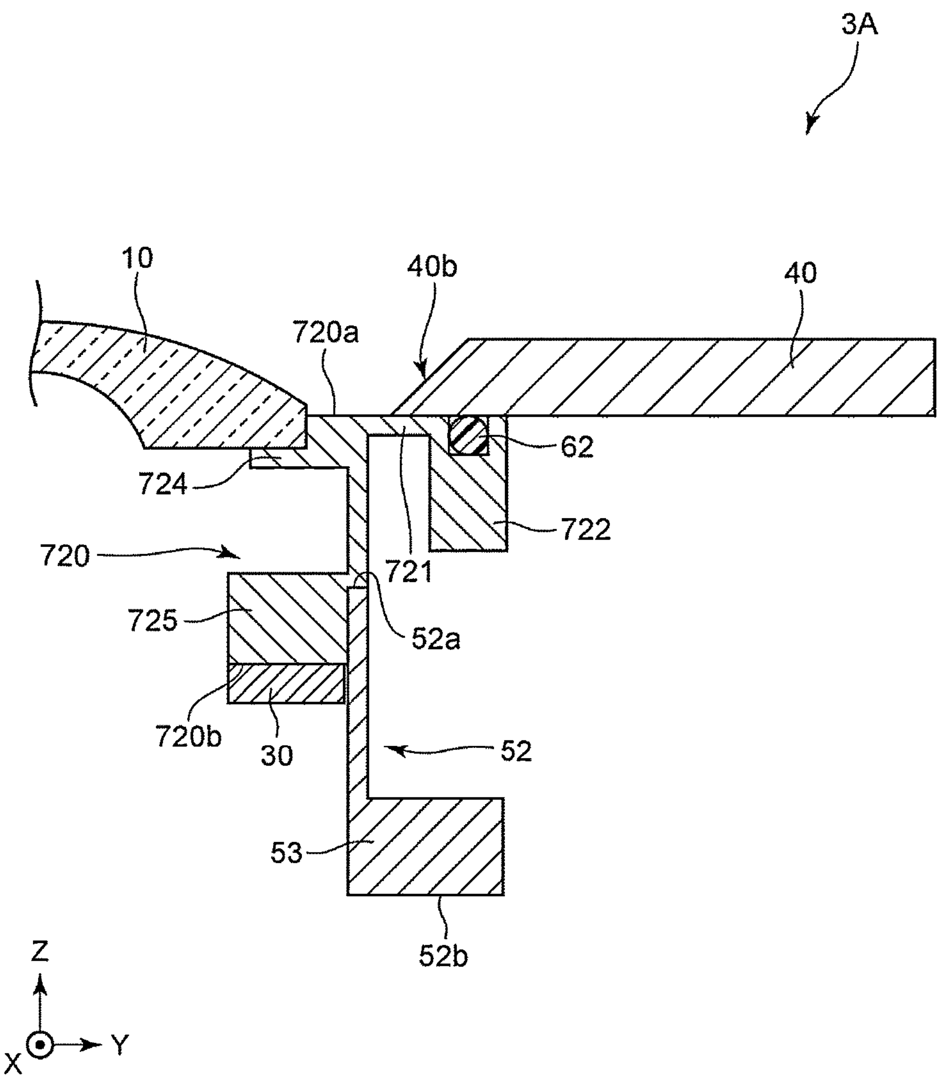
FIG. 18 is a partial cross-sectional view illustrating a vibrating device according to Modification 1 of Example Embodiment 3 of the present invention.

FIG. 18 is a partial cross-sectional view illustrating a vibrating device 3A according to Modification 1 of Example Embodiment 3. As illustrated in FIG. 18, a holding portion 52 may be provided with a base portion 53 that projects outward from a second end portion 52*b*. In this case, it is possible to stably dispose the vibrating device 3A by using a board and the like and to improve reliability of the vibrating device 3A.

Figure 19:
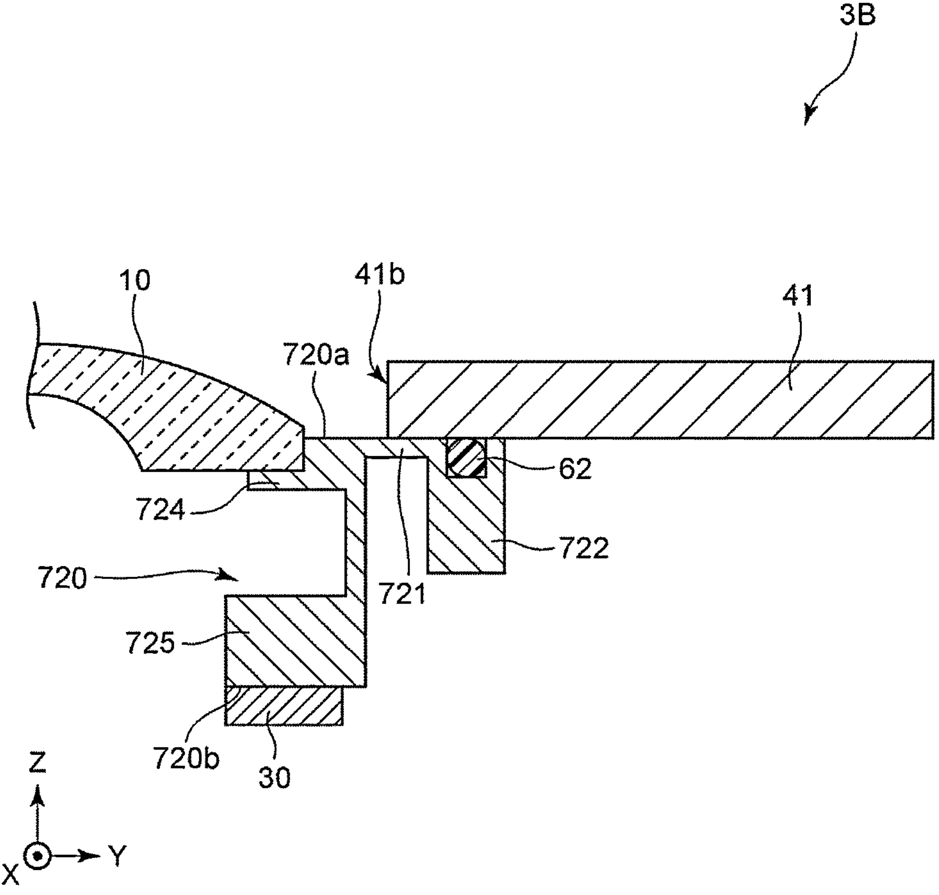
FIG. 19 is a partial cross-sectional view illustrating a vibrating device according to Modification 2 of Example Embodiment 3 of the present invention.

FIG. 19 is a partial cross-sectional view illustrating a vibrating device 3B according to Modification 2 of Example Embodiment 3. As illustrated in FIG. 19, an end portion 41*b* on a hole side of a cover 41 need not be formed into a tapered shape. The end portion 41*b* of the cover 41 can be formed into an appropriate shape in accordance with a view angle of an imaging element disposed inside the vibrating device 3B.

Figure 20:
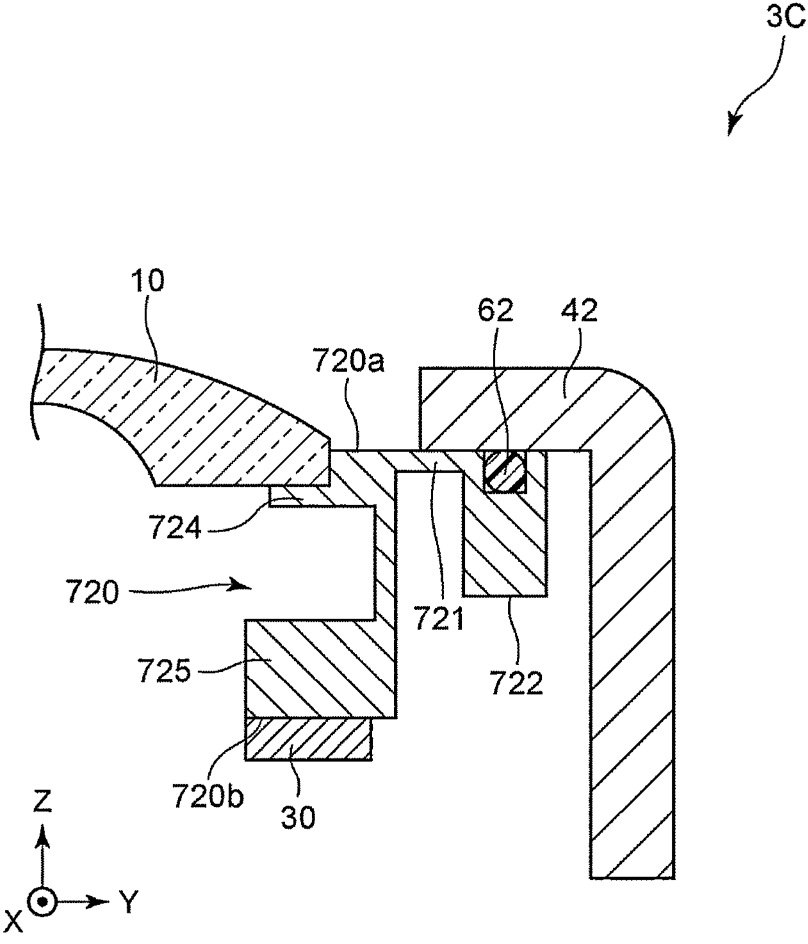
FIG. 20 is a partial cross-sectional view illustrating a vibrating device according to Modification 3 of Example Embodiment 3 of the present invention.

FIG. 20 is a partial cross-sectional view illustrating a vibrating device 3C according to Modification 3 of Example Embodiment 3. As illustrated in FIG. 20, a cover 42 may have a bent shape so that it is possible to improve a waterproof performance of the vibrating device 3C and to enhance reliability thereof.

Figure 21:
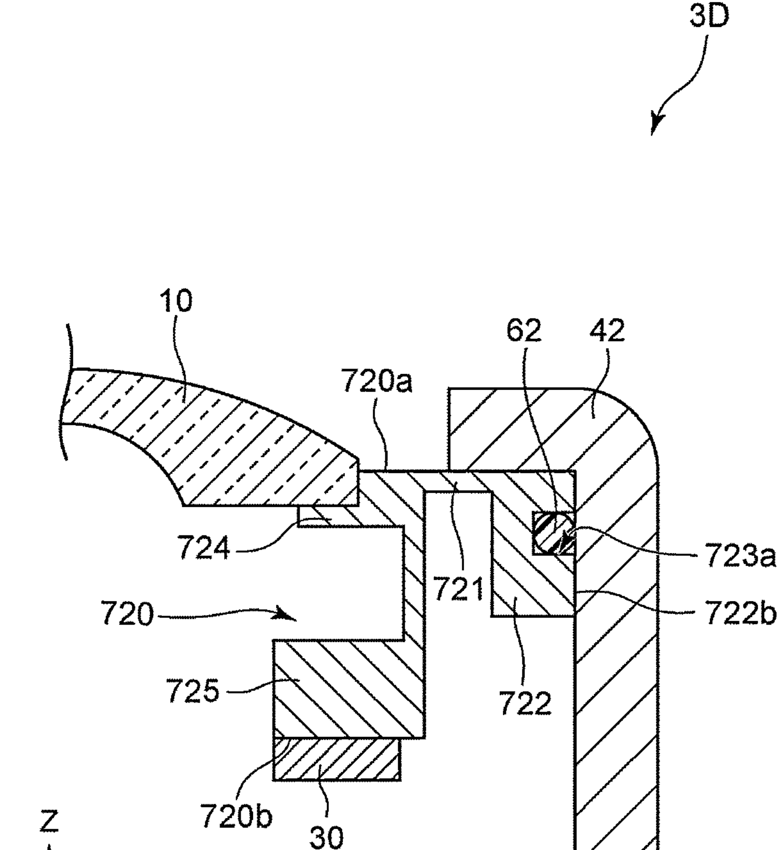
FIG. 21 is a partial cross-sectional view illustrating a vibrating device according to Modification 4 of Example Embodiment 3. of the present invention

FIG. 21 is a partial cross-sectional view illustrating a vibrating device 3D according to Modification 4 of Example Embodiment 3. As illustrated in FIG. 21, a groove 723*a* may be formed in a side surface 722*b* of the weight 722, and the seal 62 may be disposed in the groove 723*a*.

Example Embodiment 4

A vibrating device according to Example Embodiment 4 of the present invention will be described. Note that different features from those of Example Embodiment 1 will be mainly described in Example Embodiment 4. In Example Embodiment 4, elements or features identical or equivalent to those of Example Embodiment 1 will be denoted by the same reference signs and explained accordingly. Moreover, descriptions overlapping those in Example Embodiment 1 will be omitted in Example Embodiment 4.

Figure 22:
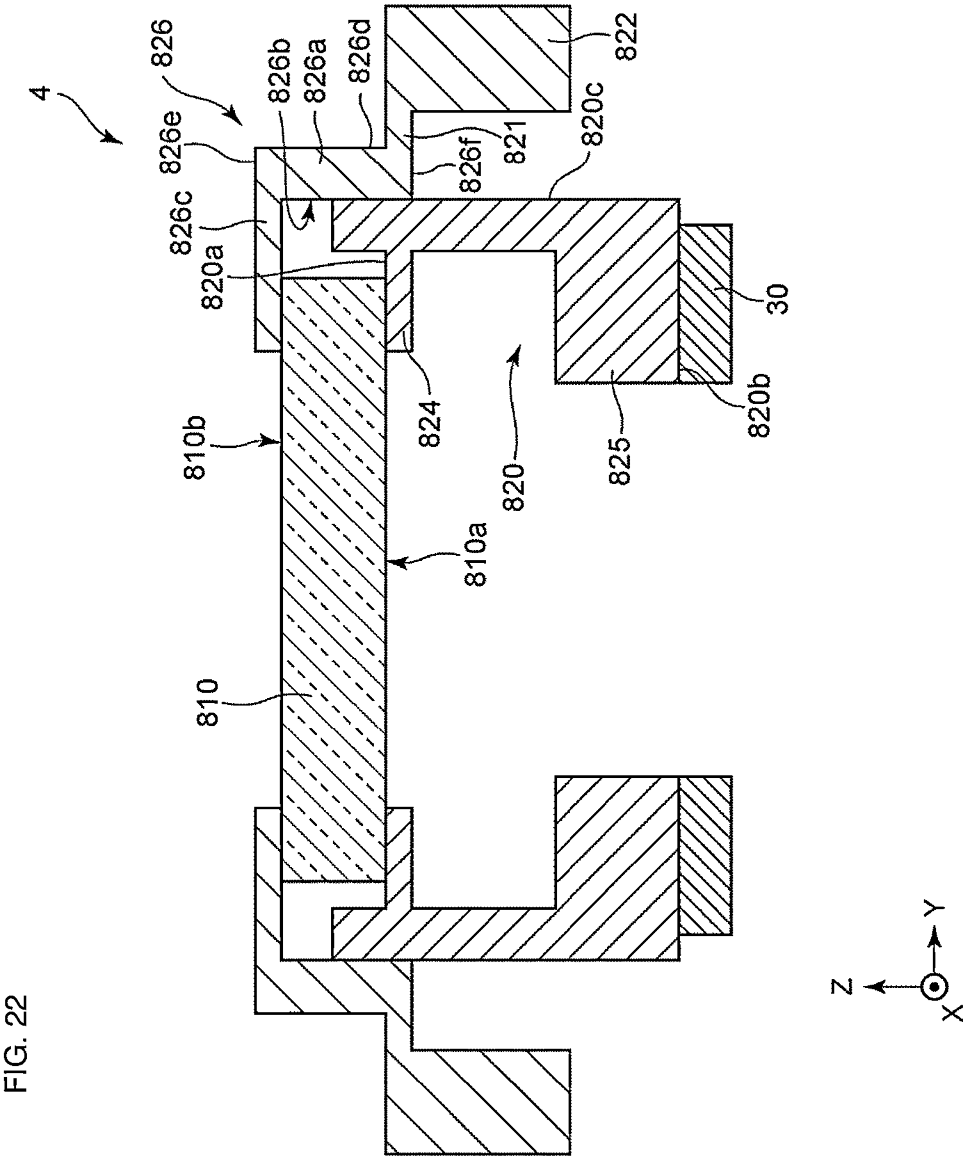
FIG. 22 is a cross-sectional view illustrating a vibrating device according to Example Embodiment 4 of the present invention.

FIG. 22 is a cross-sectional view illustrating a vibrating device 4 according to Example Embodiment 4. The Example Embodiment 4 is different from Example Embodiment 1 in that the vibrating device 4 includes a retainer 826. Moreover, Example Embodiment 4 is different from Example Embodiment 1 in that an extending portion 821 is provided to the retainer 826.

As illustrated in FIG. 22, the vibrating device 4 includes the retainer 826 which is disposed on first end portion 820*a* side of a vibrating body 820. The retainer 826 is a structure to fix a light transmitting body 810 to the vibrating body 820. The light transmitting body 810 can be fixed in such a way that the retainer 826 and the vibrating body 820 hold the light transmitting body 810 therebetween.

The retainer 826 includes a first structure 826*a* and a second structure 826*c*. The first structure 826*a* is a tubular structure to be fitted to a side wall 820*c* of the vibrating body 820. In the present example embodiment, the first structure 826*a* extends inward from first end portion 826*e* of the retainer 826. The second structure 826*c* extends inward from an inner side surface 826*b* of the first structure 826*a* and comes into contact with a surface 810*b* of the light transmitting body 810 on an opposite side from a surface 810*a* to be connected to the vibrating body.

In the present example embodiment, the extending portion 821 is provided at a second end portion 826*f* of the retainer 826 to extend outward from an outer side surface 826*d* of the first structure 826*a*. The second end portion 826*f* of the retainer 826 is located substantially at the same height as the first end portion 820*a* of the vibrating body 820 in the axial direction (the Z direction) of the vibrating body 820. Accordingly, the first end portion 820*a* of the vibrating body 820 and the extending portion 821 are disposed substantially at the same height in the axial direction (the Z direction) of the vibrating body 820. Moreover, a weight 822 is provided at a tip of the extending portion 821.

Advantageous Effects

The following advantageous effects can be achieved by the vibrating device 4 according to Example Embodiment 4.

The vibrating device 4 includes the retainer 826 disposed on the first end portion 820*a* side of the vibrating body 820. The retainer 826 includes the first structure 826*a* and the second structure 826*c*. The first structure 826*a* is the tubular structure to be fitted to the side wall 820*c* of the vibrating body 820. The second structure 826*c* extends inward from the inner side surface 826*b* of the first structure 826*a* and comes into contact with a surface 810*b* of the light transmitting body 810 on the opposite side from the surface 810*a* to be connected to the vibrating body 820. The extending portion 821 extends outward from the outer side surface 826*d* of the first structure 826*a* of the retainer 826.

According to the above-described configuration, it is possible to firmly hold the light transmitting body 810 and to transmit the vibration of the vibrating body 820 efficiently to the light transmitting body 810.

Modification

Figure 23:
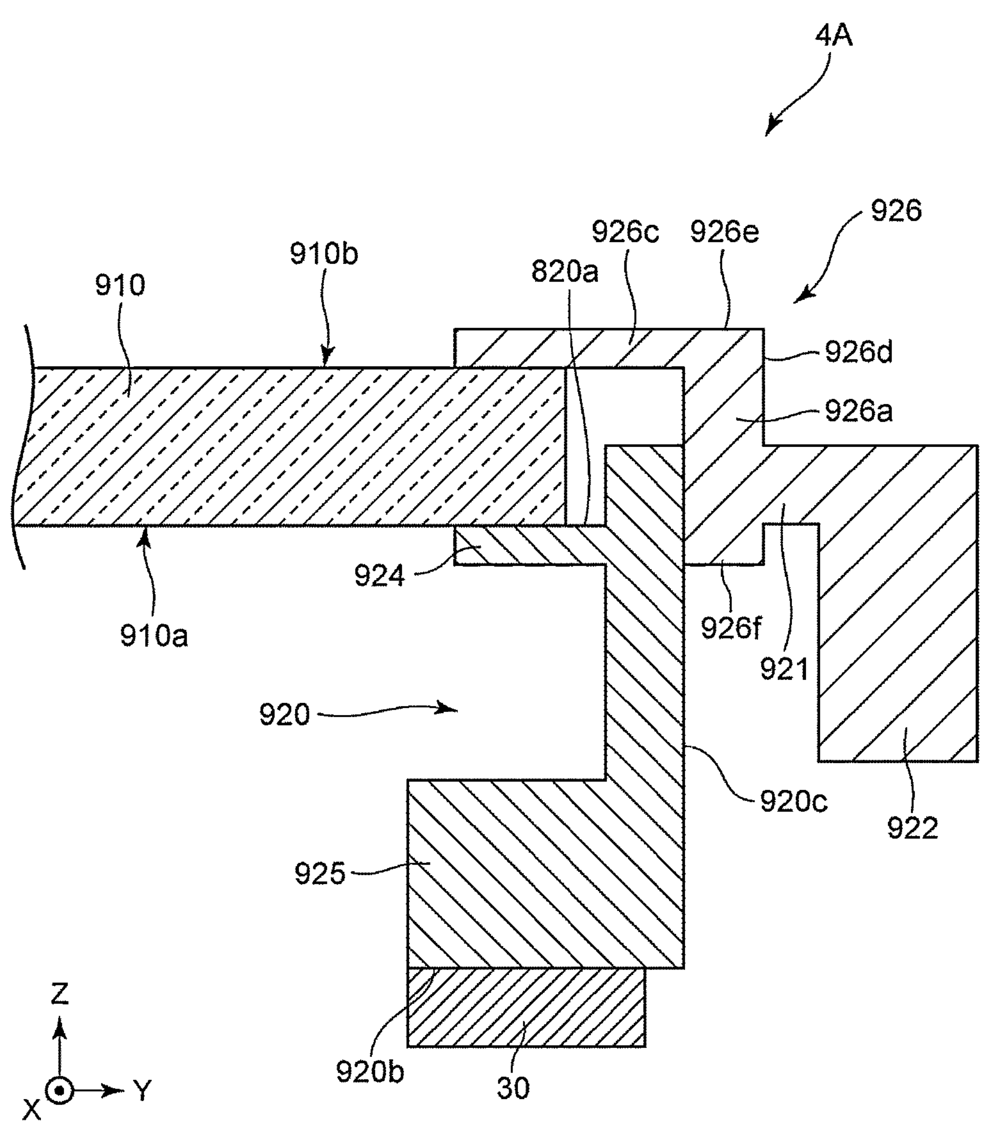
FIG. 23 is a partial cross-sectional view illustrating a vibrating device according to Modification 1 of Example Embodiment 4 of the present invention.

FIG. 23 is a partial cross-sectional view illustrating a vibrating device 4A according to Modification 1 of Example Embodiment 4. As illustrated in FIG. 23, an extending portion 921 may be provided outward from any position at an outer side surface 926*d* of a first structure 926*a* of a retainer 926. In this case as well, the extending portion 921 and a weight 922 serve as the vibration nodes, so that the same effects as those of Example Embodiment 4 can be achieved.

Vibrating devices according to example embodiments of the present invention can be applied to vehicle-mounted cameras, monitoring cameras, or optical sensors such as LiDAR to be used outdoors.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating device comprising:

a light transmitting body;

a vibrating body with a tubular structure including a first end portion, a second end portion, and a side wall joining the first and second end portions, the vibrating body being connected to the light transmitting body at the first end portion to vibrate the light transmitting body;

an extending portion extending outward from the side wall of the vibrating body; and a piezoelectric element at the second end portion of the vibrating body; wherein a plurality of weights are provided at least at any of a first surface on the first end portion side or a second surface on the second end portion side of the extending portion; and the plurality of weights are provided at the extending portion at regular intervals when viewed in an axial direction of the vibrating body.

2. The vibrating device according to claim 1, wherein the extending portion is bent toward the first end portion or the second end portion.

3. The vibrating device according to claim 1, wherein the extending portion extends outward on a side of the first end portion of the vibrating body.

4. The vibrating device according to claim 1, wherein the extending portion extends outward from the first end portion of the vibrating body.

5. The vibrating device according to claim 1, further comprising:

a retainer including:

a first structure having a tubular shape, being located on a side of the first end portion of the vibrating body, and being fitted to the side wall of the vibrating body; and a second structure extending inward from an inner side surface of the first structure and contactable with a surface of the light transmitting body on an opposite side from a surface to be connected to the vibrating body; wherein the extending portion extends outward from an outer side surface of the first structure of the retainer.

6. A vibrating device comprising:

a light transmitting body;

a vibrating body with a tubular structure including a first end portion, a second end portion, and a side wall joining the first and second end portions, the vibrating body being connected to the light transmitting body at the first end portion to vibrate the light transmitting body;

an extending portion extending outward from the side wall of the vibrating body;

a piezoelectric element at the second end portion of the vibrating body;

at least one weight provided at least at any of a first surface on the first end portion side or a second surface on the second end portion side of the extending portion; and a cover provided with a hole to expose the light transmitting body, the cover being outside the light transmitting body and being fitted to the extending portion to come into contact with a surface of the at least one weight; wherein the at least one weight has a closed shape; and a seal is provided in a groove in the surface of the at least one weight.

7. The vibrating device according to claim 6, wherein an end portion on a side of the hole of the cover has a tapered shape with a thickness that decreases toward the light transmitting body.

8. The vibrating device according to claim 1, wherein the vibrating body includes:

a first projecting portion projecting inward from the first end portion; and a second projecting portion projecting inward from the second end portion.

9. An imaging device comprising:

the vibrating device according to claim 1; and an imager inside the vibrating device.

10. The vibrating device according to claim 6, wherein the extending portion is bent toward the first end portion or the second end portion.

11. The vibrating device according to claim 6, wherein the extending portion extends outward on a side of the first end portion of the vibrating body.

12. The vibrating device according to claim 6, wherein the extending portion extends outward from the first end portion of the vibrating body.

13. The vibrating device according to claim 6, further comprising:

a retainer including:

a first structure having a tubular shape, being located on a side of the first end portion of the vibrating body, and being fitted to the side wall of the vibrating body; and a second structure extending inward from an inner side surface of the first structure and contactable with a surface of the light transmitting body on an opposite side from a surface to be connected to the vibrating body; wherein the extending portion extends outward from an outer side surface of the first structure of the retainer.

14. The vibrating device according to claim 1, further comprising:

a cover provided with a hole to expose the light transmitting body, the cover being outside the light transmitting body and being fitted to the extending portion to come into contact with a surface of one of the plurality of weights; wherein the one of the plurality of weights has a closed shape; and a seal is provided in a groove in the surface of the one of the plurality of weights.

15. The vibrating device according to claim 14, wherein an end portion on a side of the hole of the cover has a tapered shape with a thickness that decreases toward the light transmitting body.

16. The vibrating device according to claim 6, wherein the vibrating body includes:

a first projecting portion projecting inward from the first end portion; and a second projecting portion projecting inward from the second end portion.

17. An imaging device comprising:

the vibrating device according to claim 6; and an imager inside the vibrating device.

* * * * *